(12) United States Patent
Hammond et al.

(10) Patent No.: US 10,501,817 B2
(45) Date of Patent: Dec. 10, 2019

(54) PROCESS FOR THE MANUFACTURE OF CO-CRYSTALLIZED SUCROSE NATURAL SWEETENERS AND THE PRODUCTS THEREOF

(75) Inventors: James P. Hammond, Ellabell, GA (US); Roxanne Resch, Sugar Land, TX (US); Thomas Rathke, Bluffton, SC (US); Darrell Gerdes, Sugar Land, TX (US)

(73) Assignee: IMPERIAL SUGAR COMPANY, Sugarland, TX (US)

( * ) Notice: Subject to any disclaimer, the term of this patent is extended or adjusted under 35 U.S.C. 154(b) by 0 days.

(21) Appl. No.: 13/049,840

(22) Filed: Mar. 16, 2011

(65) Prior Publication Data
US 2011/0236551 A1    Sep. 29, 2011

Related U.S. Application Data

(60) Provisional application No. 61/314,541, filed on Mar. 16, 2010.

(51) Int. Cl.
*C13B 50/00* (2011.01)
*C13B 30/02* (2011.01)
*A23L 27/30* (2016.01)

(52) U.S. Cl.
CPC ............ *C13B 50/004* (2013.01); *A23L 27/30* (2016.08); *A23L 27/36* (2016.08); *C13B 30/021* (2013.01); *C13B 50/002* (2013.01); *A23V 2002/00* (2013.01)

(58) Field of Classification Search
CPC ........ A23L 1/236; A23L 1/2366; A23L 27/36; A23L 1/2363; C13B 30/021; C13B 50/002

USPC ......................................................... 426/548
See application file for complete search history.

(56) References Cited

U.S. PATENT DOCUMENTS

| 4,101,680 A | 7/1978 | Edwards |
| 4,362,757 A | 12/1982 | Chen et al. |
| 4,423,085 A | 12/1983 | Chen et al. |
| 4,746,520 A | 5/1988 | Smits et al. |

(Continued)

FOREIGN PATENT DOCUMENTS

| CN | 101472487 | 7/2009 |
| EP | 0219150 | 4/1987 |

(Continued)

OTHER PUBLICATIONS

Yantis, J. E., ed., "The Role of Sensory Analysis in Quality Control," ASTM Manual Series, MNL 14 (1992).*

(Continued)

*Primary Examiner* — Jeffrey P Mornhinweg
(74) *Attorney, Agent, or Firm* — Keith G. Haddaway; Venable LLP

(57) ABSTRACT

Processes for the production of reduced calorie sweetening compositions having a natural sweetener such as a steviol glycosides (e.g., rebaudioside A) and sucrose as the major components is described, as well as the product of such processes having unique physical and sensory characteristics. In particular, a co-crystallization process of manufacturing a reduced calorie sweetening composition that comprises both sucrose and at least one natural sweetener as a co-crystallized product is disclosed, as well as the free-flowing powder product resultant therefrom.

20 Claims, 13 Drawing Sheets

(56) References Cited

U.S. PATENT DOCUMENTS

| | | | |
|---|---|---|---|
| 4,910,031 | A | 3/1990 | Budd et al. |
| 4,971,797 | A | 11/1990 | Cherukuri et al. |
| 4,981,698 | A | 1/1991 | Cherukuri et al. |
| 5,021,249 | A | 6/1991 | Bunick et al. |
| 6,214,402 | B1 | 4/2001 | Fotos et al. |
| 6,461,659 | B1 | 10/2002 | Zhou |
| 6,570,036 | B1 | 5/2003 | Reuter |
| 6,875,460 | B2 | 4/2005 | Cunningham |
| 7,468,347 | B2 | 12/2008 | Scheibel et al. |
| 7,507,423 | B2 | 3/2009 | Wallace |
| 7,842,324 | B2 | 11/2010 | Tachdjian et al. |
| 7,863,307 | B2 | 1/2011 | Miller |
| 8,791,253 | B2 | 7/2014 | Prakash et al. |
| 8,937,168 | B2 | 1/2015 | Evans et al. |
| 2006/0068073 | A1 | 3/2006 | Catani |
| 2006/0093720 | A1 | 5/2006 | Tatz |
| 2006/0134292 | A1 | 6/2006 | Abelyan et al. |
| 2007/0059419 | A1 | 3/2007 | Catani |
| 2007/0082103 | A1 | 4/2007 | Magomet et al. |
| 2007/0116828 | A1 | 5/2007 | Prakash et al. |
| 2008/0014331 | A1 | 1/2008 | Badalov |
| 2008/0248176 | A1 | 10/2008 | Brown |
| 2008/0268109 | A1 | 10/2008 | Roman |
| 2008/0292775 | A1 | 11/2008 | Prakash et al. |
| 2009/0004355 | A1 | 1/2009 | Catani |
| 2009/0017185 | A1 | 1/2009 | Catani |
| 2009/0124685 | A1 | 5/2009 | Gutierrez-Uribe |
| 2010/0034945 | A1 | 2/2010 | Ngenio Del Cauca |
| 2010/0055255 | A1 | 3/2010 | Doyle |
| 2010/0092638 | A1 | 4/2010 | Hansen |
| 2010/0215738 | A1 | 8/2010 | Ritter et al. |
| 2010/0227034 | A1 | 9/2010 | Purkayastha et al. |
| 2010/0292175 | A1 | 11/2010 | Wessjohann et al. |

FOREIGN PATENT DOCUMENTS

| | | |
|---|---|---|
| EP | 0470259 | 2/1992 |
| JP | 5754575 | 4/1982 |
| JP | 56121454 | 2/1983 |
| JP | 56121455 | 2/1983 |
| JP | 6075252 | 4/1985 |
| JP | 62-220167 | 9/1987 |
| JP | 62220167 | 9/1987 |
| JP | 08214 | 1/1996 |
| JP | 2002045145 | 2/2002 |
| KR | 20000067481 | 11/2000 |
| WO | 9607331 | 3/1996 |
| WO | 00/15050 | 3/2000 |
| WO | 0015050 | 3/2000 |
| WO | 2007061757 | 5/2007 |

OTHER PUBLICATIONS

Smeets, D., International Search Report for International Patent Application No. PCT/US2011/028739, dated May 20, 2011, European Patent Office.

Smeets, D., Written Opinion for International Patent Application No. PCT/US2011/028739, dated May 20, 2011, European Patent Office.

Bhandari, Bhesh R. et al. "Co-crystallization of honey with sucrose" LWT—Food Science and Technology vol. 31, Issue 2, Mar. 1998, pp. 138-142.

Birch, Gordon CG. "Towards an improved understanding of sweetener synergy" Trends in Food Science & Technology, Special Issue on Flavour Perception, vol. 7, Dec. 1996, pp. 403-407.

Boonkaewwan, Chaiwat et al. "Specific immunomodulatory and secretory activities of stevioside and steviol in intestinal cells" Journal of Agricultural and Food Chemistry, vol. 56, No. 10, 2008, pp. 3777-3784.

Calabia, Buenaventurada P. et al. "Production of D-lactic acid from sugarcane molasses, sugarcane juice and sugar beet juice by Lactobacillus delbrueckii" Biotechnology Letters, Sep. 2007, vol. 29, Issue 9, pp. 1329-1332.

Carakostas, M.C. et al. "Overview: The history, technical function and safety of rebaudioside A, a naturally occurring steviol glycoside, for use in food and beverages" Food and Chemical Toxicology, vol. 46, Issue 7, Supplement, Jul. 2008, pp. S1-S10.

Chang, Shin S. "Stability studies of stevioside and rebaudioside A in carbonated beverages" J. Agric. Food Chem., 1983, 31 (2), pp. 409-412.

Deladino, Lorena "Microstructure of minerals and yerba mate extract co-crystallized with sucrose" Journal of Food Engineering, vol. 96, Issue 3, Feb. 2010, pp. 410-415.

DuBois, Grant E. "Diterpenoid sweeteners. Synthesis and sensory evaluation of stevioside analogs with improved organoleptic properties" J. Med. Chem., 1985, 28 (1), pp. 93-98.

Eggleston, Gillian et al. "Preheating and Incubation of Cane Juice Prior to Liming: A Comparison of Intermediate and Cold Lime Clarification" J. Agric. Food Chem., 2002, 50 (3), pp. 484-490.

Ganesan, V. et al "Flowability and handling characteristics of bulk solids and powders—a review with implications for DDGS" Biosystems Engineering, vol. 101, Issue 4, Dec. 2008, pp. 425-435.

Garcia-Noguera, Juan et al. "Dual-stage sugar substitution in strawberries with a Stevia-based sweetener" Innovative Food Science & Emerging Technologies, vol. 11, Issue 1, Jan. 2010, pp. 225-230.

Gardana, Claudio et al. "Metabolism of Stevioside and Rebaudioside A from Stevia rebaudiana Extracts by Human Microflora" J. Agric. Food Chem., 2003, 51 (22), pp. 6618-6622.

Geldart, D. et al "Characterization of powder flowability using measurement of angle of repose" China Particuology, vol. 04, Issue 03n04, 2006, pp. 104-107.

Geuns, Jan M.C. "Molecules of Interest: Stevioside" Phytochemistry, vol. 64, Issue 5, Nov. 2003, pp. 913-921.

Hamissa, Aicha Menyar Ben et al. "Phenolics extraction from Agave americana (L.) leaves using high-temperature, high-pressure reactor" Food and Bioproducts Processing, vol. 90, Issue 1, Jan. 2012, pp. 17-21.

Hanson, J.R. et al "Stevioside and related sweet diterpenoid glycosides" Natural Product Reports, 1993,10, pp. 301-309.

Horst, Joop H. et al. "Co-Crystal Polymorphs from a Solvent-Mediated Transformation" Crystal Growth & Design, 2008, 8 (7), pp. 2537-2542.

Kinghorn, A. Douglas "Biologically Active Compounds from Plants with Reputed Medicinal and Sweetening Properties" Journal of Natural Products, 1987, 50 (6), pp. 1009-1024.

Kolb, N. et al. "Analysis of Sweet Diterpene Glycosides from Stevia rebaudiana: Improved HPLC Method" J. Agric. Food Chem., 2001, 49 (10), pp. 4538-4541.

Lee, Joo Won et al. "Investigation of the Healing Rate Dependency Associated with the Loss of Crystalline Structure in Sucrose, Glucose, and Fructose Using a Thermal Analysis Approach (Part I)" J. Agric. Food Chem., 2011, 59, pp. 684-701.

Lee, Tu et al. "Sucrose Conformational Polymorphism: A Jigsaw Puzzle with Multiple Routes to a Unique Solution" Cryst. Growth Des., 2009, 9 (8), pp. 3551-3561

Lorena, Deladino et al. "Co-crystallization of yerba mate extract (*Ilex paraguariensis*) and mineral salts within a sucrose matrix" Journal of Food Engineering, vol. 80, Issue 2, May 2007, pp. 573-580.

Minne, Veerle J. Y. et al. "Steviol Quantification at the Picomole Level by High-Performance Liquid Chromatography" J. Agric. Food Chem., 2004, 52 (9), pp. 2445-2449.

Mizutani, Kenji et al. "Use of Stevia rebaudiana sweeteners in Japan" Stevia: The Genus *Stevia*, edited by A. Douglas Kinghorn, 2002. pp. 178-195.

Mullarney, Matthew P. et al. "The powder flow and compact mechanical properties of sucrose and three high-intensity sweeteners used in chewable tablets" International Journal of Pharmaceutics, vol. 257, Issues 1-2, May 12, 2003, pp. 227-236.

Ohtani, Kuzuhiro et al. "Further study on the 1,4-x-transglucosylation of Rubusoside, a Sweet Steviol-Bisglucoside from Rubus Suavissimus" Agric. Biol. Chem., 55 (2), 1991, pp. 449-453.

Okamoto, Katsuyuki et al. "Purification and Some Properties of a β-Glucosidase from Flavobacterium johnsonae" Bioscience, Biotechnology, and Biochemistry, vol. 64, Issue 2, 2000, pp. 333-340.

(56) References Cited

OTHER PUBLICATIONS

Ouiazzane, S. et al. "Estimation of sucrose crystallization kinetics from batch crystallizer data" Journal of Crystal Growth, vol. 310, Issue 4, Feb. 15, 2008, pp. 798-803.
Pant, G. et al. "Spirostanol glycosides from Agave cantala" Phytochemistry, vol. 25, Issue 6, May 22, 1986, pp. 1491-1494.
Pant, G. et al. "A spirostanol glycoside from Agave cantala" Phytochemistry, vol. 25, Issue 12, 1986, pp. 2895-2896.
Prakash, I. et al "Development of rebiana, a natural, non-caloric sweetener" Food and Chemical Toxicology, vol. 46, Issue 7, Supplement, Jul. 2008, pp. S75-S82.
Sardesai, Vishwanath M. et al. "Natural and synthetic intense sweeteners" The Journal of Nutritional Biochemistry, vol. 2, Issue 5, May 1991, pp. 236-244.
Tanaka, Osamu "Steviol-glycosides: new natural sweeteners" TrAC Trends in Analytical Chemistry, vol. 1, Issue 11, Jul. 1982, pp. 246-248.
Urbanus, Johan et al. "Co-Crystallization as a Separation Technology: Controlling Product Concentrations by Co-Crystals" Cryst. Growth Des., 2010, 10 (3), pp. 1171-1179.
"Rubusoside Chemical Properties,Usage,Production" Chemical Book. http://www.chemicalbook.com/ChemicalProductProperty_EN_CB4230515.htm, Date of Access May 6, 2015.
Office Action received in AU 2014271347, dated Aug. 10, 2015. 4 pages.
Office Action issued in corresponding Mexican Patent Application No. MX/a/2012/010738 dated Jul. 21, 2017.

\* cited by examiner

Sample Preparation Grid

| | Sugar (100%) | | | Co-Crystal (50% Reduction) | | | Co-Crystal (75% Reduction) | | | Sugar (50% Reduction) + Reb-A | | |
|---|---|---|---|---|---|---|---|---|---|---|---|---|
| | g | % | batch | g | % | batch | g | % | batch | g | % | batch |
| Water, Evian | 238.0000 | 96.7480% | 773.9837 | 238.0000 | 98.3471% | 786.7769 | 238.0000 | 99.1667% | 793.3333 | 238.0000 | 98.3471% | 786.7769 |
| Sugar | 8.0000 | 3.2520% | 26.0163 | | | | | | | 3.9867 | 1.6474% | 13.1792 |
| 50% Co-Crystal | | | | 4.0000 | 1.6529% | 13.2231 | | | | | | |
| 75% Co-Crystal | | | | | | | 2.0000 | 0.8333% | 6.6667 | | | |
| Reb-A 97 | | | | | | | | | | 0.0133 | 0.0055% | 0.0440 |
| Truvia | | | | | | | | | | | | |
| TOTAL | 246.0000 | 100.0000% | 800 g | 242.0000 | 100.0000% | 800 g | 240.0000 | 100.0000% | 800 g | 242.0000 | 100.0000% | 800 g |

| | Sugar (75% Reduction) + Reb-A | | | Truvia (100%) | | | Reb-A 97 (100%) | | |
|---|---|---|---|---|---|---|---|---|---|
| | g | % | batch | g | % | batch | g | % | batch |
| Water, Evian | 238.0000 | 99.1667% | 793.3333 | 238.0000 | 98.5507% | 788.4058 | 238.0000 | 99.6412% | 797.1297 |
| Sugar | 1.9800 | 0.8250% | 6.6000 | | | | | | |
| 50% Co-Crystal | | | | | | | | | |
| 75% Co-Crystal | | | | | | | | | |
| Reb-A 97 | 0.0200 | 0.0083% | 0.0667 | | | | 0.8570 | 0.3588% | 2.8703 |
| Truvia | | | | 3.5000 | 1.4493% | 11.5942 | | | |
| TOTAL | 240.0000 | 100.0000% | 800 g | 241.5000 | 100.0000% | 800 g | 238.8570 | 100.0000% | 800 g |

FIG. 6

PROCESS FOR THE MANUFACTURE OF CO-CRYSTALLIZED SUCROSE NATURAL SWEETENERS AND THE PRODUCTS THEREOF

CROSS REFERENCE TO RELATED APPLICATIONS

The present application claims priority to U.S. Provisional Patent Application Ser. No. 61/314,541, filed Mar. 16, 2010, the contents of which are incorporated herein by reference in its entirety.

STATEMENT REGARDING FEDERALLY SPONSORED RESEARCH OR DEVELOPMENT

Not applicable.

REFERENCE TO APPENDIX

Detailed results of the flavor and taste tests for the co-crystallized rebaudioside A/sucrose products prepared in accordance with the methods of the present disclosure, compared with other known sweeteners, is presented in Appendix A.

BACKGROUND OF THE INVENTION

Field of the Invention

The inventions disclosed and taught herein relate generally to reduced-calorie natural sweeteners and methods for their production. More specifically, the inventions disclosed and taught herein are related to processes for the manufacture of reduced-calorie sweetener compositions that include sucrose and natural sweeteners, such as *Stevia* or other sweet glycosides from *Stevia Rebaudiana*, using a co-crystallization process, and the unique product resulting therefrom exhibiting flavor and physical characteristics similar to natural sugar.

Description of the Related Art

People often customize the taste of their food and beverages by adding sweeteners thereto. For example, tabletop sweeteners are added to beverages, such as coffee and tea; on cereals; on fruit; and as toppings on baked goods. Sweetening a food or beverage with a tabletop sweetener alters its flavor and usually increases its appeal to the consumer.

Personal taste creates considerable variability in the amount of sweetness that one person prefers in a given food or beverage versus another person. For example, the amount of sweetness incorporated into a foodstuff during commercial production may not be adequate to satisfy some consumers while other consumers may find that the same amount of sweetness to be excessive. Moreover, consumers often desire to reduce their caloric intake for health or lifestyle reasons. Therefore, there exists a long-felt need for tabletop sweetener products that consumers may use to increase the sweetness of a product at the time of consumption that are consistent with their personal preferences and minimize additional caloric burden, such as in the form of reduce-calorie sweeteners. Tabletop sweeteners are a primary vehicle by which such taste customization is accomplished. Tabletop sweeteners are presently available in many different forms, including, free-flowing granular, tablets, cohesive non-free flowing compositions (e.g., cubes), and the like.

Many types of sweeteners are available as tabletop sweeteners. These include natural sweeteners, such as, sucrose (i.e., cane sugar), honey, high fructose corn syrup, molasses, maple syrup, brown rice syrup, fruit juice sweeteners, barley malt, *Stevia* and the like, as well as artificial sweeteners, such as, sucralose, aspartame, Acesulfame potassium, saccharin and the like.

Commonly available sweeteners have slightly different tastes that are variably preferred by individuals. Many sweeteners, particularly the non-natural sweeteners, impart a bitter taste to the foods they sweeten. Saccharin, for example, is a sweetener that is known to impart a bitter taste. Other sweeteners have other taste components such as lingering metallic tastes, cooling or drying sensations, or combinations of such undesirable characteristics and flavor sensations. In some cases, food ingredients have been used to overcome the bitterness. For example, cream of tartar is included in commonly sold saccharin packets.

The most common sweeteners are the so-called "nutritive" sweeteners. Nutritive sweeteners not only provide sweetness, but are also absorbable into the bloodstream and may be metabolized to provide energy for immediate use or for storage as fat. Nutritive sweeteners are typically extracted from plants that produce them in various quantities and for various purposes. For example, sucrose, a nutritive sweetener in wide spread use, is produced from many sources, e.g., sugar cane and sugar beet roots.

Sugar alcohols are another form of sweetener. Sugar alcohols vary in sweetness from about half as sweet to about as sweet as sucrose. Accordingly, sugar alcohols may be used in place of sugar. Sugar alcohols have about one-half to three-quarters the amount of calories of sugar on a per weight basis. Sugar alcohols are slowly and incompletely absorbed from the small intestine into the blood. Absorbed sugar alcohols are converted to energy by processes that require little or no insulin. Accordingly, these sweeteners may be used by diabetics or those on low-carbohydrate diets.

High intensity sweeteners are well known alternatives to nutritive sweeteners. High intensity sweeteners provide sweetness without the calories and other metabolic impacts of the nutritive sweeteners. In many cases, high intensity sweeteners provide a sweet flavor that is preferred to nutritive sweeteners. Some high intensity sweeteners, such as, aspartame, are nutritive, but are so intense that they still provide negligible calories because very small amounts are required. Other high intensity sweeteners, such as, for example sucralose, are not absorbed when ingested and are, therefore, non-nutritive sweeteners.

Often, the manufacturers or users of these sweeteners add other components to them to overcome a less pleasant taste, for example, a bitter taste. For example, cream of tartar may be added to saccharin to offset its bitterness; and 2,4-dihydroxybenzoic acid may be added to sucralose to control lingering sweetness. However, with the growing trend towards natural food products among consumers, the use of such synthetic or non-natural additives to the sweetener products to offset unpleasant taste effects is undesirable.

In view of these issues, there is increasing interest in the use of naturally-occurring, non-caloric sweeteners, particularly those derived from or extracted from plants or other natural products. *Stevia*, an extract of the native South American plant *Stevia Rebaudiana* Compositae Bertoni, has been used for years by itself as a sweetener in South America, Asia, and more recently, Europe. The *Stevia* plant is commercially cultivated in Japan, Singapore, Taiwan, Malaysia, South Korea, China, Israel, India, Brazil, Australia and Paraguay. *Stevia* is one of several non-caloric natural sweeteners from *Stevia rebaudiana* bertoni—the plant produces a number of sweet compounds collectively referred to as steviol glycosides, which make *Stevia* 300 times sweeter than sucrose alone. One particular extract, rebaudioside A, is a non-caloric sweetener with functional and sensory properties much superior to those of many other non-caloric sweeteners, and which in processed form can be 70 to 400 times more potent than sugar. These steviol glycosides can be extracted from the plant using a variety of natural product extraction processes described in the art. These naturally-occurring sweeteners are heat stable, pH stable, do not ferment, and do not induce a glycemic response in humans. However, *Stevia* and *Stevia* plant extracts also have a strong bitter component which makes their use in sweeteners more challenging.

Of the diterpenoid glycoside sweeteners identified to date in *Stevia* extracts, rebaudioside A has been identified as the least astringent, the least bitter, and with the least persistent aftertaste. This aftertaste has been described by many as bitter and licorice like, and is present in all current *Stevia* extracts. However, rebaudioside A (and the other diterpenoid gylcosides) still exhibits flavor and taste characteristics that distinguish it from sugar. Thus, while *Stevia* extracts have many excellent properties, improvements in their taste profile would clearly be desirable.

Like with all high-intensity sweetener-containing sweetener compositions, *Stevia* containing sweetener compositions typically have been provided with a bulking agent to aid in measurement and distribution into the users application. Among those disclosed or used include FOS and other fibers, maltodextrins, and erythritol. Erythritol is especially popular as it can mitigate some of the bitter taste. Further, due to the poor solubility of *Stevia* and *Stevia*-related glycosides in many solvents, particularly solvents which can be used in food-related products, it's introduction into products such as sugar and other sweeteners has, for the most part, been limited to blending processes, which suffers from lack of uniform mixing despite the blending process employed, and an associated disfavored sweetness flavor profile.

It has been interestingly discovered herein that in sweetening compositions including simple sugars such as sucrose and natural sweeteners such as *Stevia* extracts, the bitter/licorice taste of the natural sweetener (e.g., rebaudioside A) is modulated by simple sugars (e.g., refined sucrose), but not by complex sweeteners, e.g., maple and molasses. This is surprising as complex sugars have an inherent multidimensional taste would tend to "hide" the licorice note from the rebaudioside. Even more surprising, the simple sugars, which have only sweet taste, modulate the licorice note from rebaudioside A even when they contribute less than half the sweetness of the sweetening composition. Thus, it is surprising that the combination of low *Stevia* levels, high purity rebaudioside A, and a simple refined sugar, such as sucrose or fructose, creates a sweetener composition with much lower characteristic licorice taste of *Stevia*. These have not been previously used due to the apparent contradiction of using a simple sugar in formulations which are inherently sugar substitutes.

The inventions disclosed and taught herein are directed to an improved, reduced calorie sweetener composition containing naturally-occurring sweeteners (such as *Stevia* or *Stevia* diterpenoid glycosidic extracts) and sucrose, as well as an improved method of preparing such products that includes a controlled co-crystallization process to form the new, co-crystalline product having a flavor profile substantially similar to pure sugar.

BRIEF SUMMARY OF THE INVENTION

Reduced calorie sweetening compositions comprising, consisting of, or consisting essentially of sucrose and a natural sweetener are described herein, wherein the compositions exhibit unique physical characteristics, and have a flavor profile similar to pure sugar. Also described a processes for manufacturing such reduced calorie sweetening compositions using a co-crystallization process step.

In accordance with a first embodiment of the present disclosure, a process for the preparation of a sucrose and natural sweetener co-crystallization product is described, the process comprising the steps of contacting a solution of sucrose at an elevated temperature with a natural sweetener at an elevated temperature to produce a solution of sucrose and natural sweetener; heating the solution of a mixture of sucrose and natural sweetener for a period of time; and producing a co-crystallization sucrose/natural sweetener product by co-crystallizing the heated solution mixture using a controlled, co-crystallization process with air cooling and vacuum evaporation. In further accordance with this process, the process may further comprise contacting the solution of a mixture of sucrose and natural sweetener with invert syrup. In accordance with this embodiment, the natural sweetener may be an extract of *Stevia rebaudiana* (Bertoni), and in further aspects of the this embodiment the natural sweetener may be stevioside or rebaudioside A.

In accordance with a further embodiment of the present disclosure, a reduced-calorie sugar composition comprising dry powder particles and which comprise a co-crystallization product of sucrose and a natural sweetener is described, the composition's dry powder particles having a size between 100 and 2000 microns in size, an exhibited powder flowability with an angle of repose (AOR) of about 45° or less, and which are characterized by an XRPD profile having one or more distinct peaks within the range of from about 10 to 27 degrees 2 Theta (+/−5 degrees). In further accordance with an aspect of this embodiment, the co-crystallization product may have an XRPD profile with at least one peak at about 20 degrees 2 Theta (+/−5 degrees). In yet another aspect of this embodiment, the co-crystallization product may be characterized as having a angle of repose (AOR) from about 20° to about 50°, more preferably of about 45° or less, and even more preferably of about 40° or less. In a further aspect of this embodiment, the co-crystallization product may be characterized such that the natural sweetener in the co-crystallization product is present in an amount of about 0.01 to about 50% by weight of the product. In a further aspect of this embodiment, the co-crystallization product may be characterized as having a DSC curve with an endothermic peak at about 179° C. In accordance with yet another aspect of the present disclosure, the co-crystallization product prepared according to the methods described herein may be characterized by peaks in the carbon-13 NMR spectrum having chemical shift values of about 104.8, about 104.1, about 101.9, about 98.4, about 96.3, about 94.4, and about 92.5 ppm.

In a further embodiment of the present disclosure, a reduced-calorie sweetener containing a co-crystallized *Stevia*-derived natural sweetener substance is described, the reduced-calorie sweetener comprising a *Stevia*-derived sweet substance and sucrose, wherein the weight % of sucrose with respect to the weight % of the *Stevia*-derived sweet substance is at least 10 times greater, and wherein the sweetener has a taste flavor profile substantially the same as natural sucrose, as shown in FIG. 7.

In accordance with a further aspect of the present disclosure, a sucrose and natural sweetener co-crystallization product having reduced calories and a flavor profile substantially similar to that of natural sugar is described, wherein the product is prepared using a co-crystallization process as described herein.

In accordance with yet another aspect of the present disclosure, a comestible including the co-crystallization product prepared in accordance with the processes of the present disclosure is described, wherein the comestible is selected from the group consisting of bakery goods, ice cream, sauces, desserts, and breads.

In accordance with a further aspect of the present disclosure, a co-crystallized natural sweetener product prepared in accordance with the methods of the present disclosure is described, wherein the product is packed in single-serve packets. In further accordance with this aspect of the invention, the co-crystallized natural sweetener product exhibits reduced calories compared to sucrose alone, and in select aspects comprises sucrose, a *Stevia* glycoside such as rebaudioside-A, and invert.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 6 shows the exemplary sample preparation grids for the samples used in the sweetener tasting comparison tests.

Figure 1:
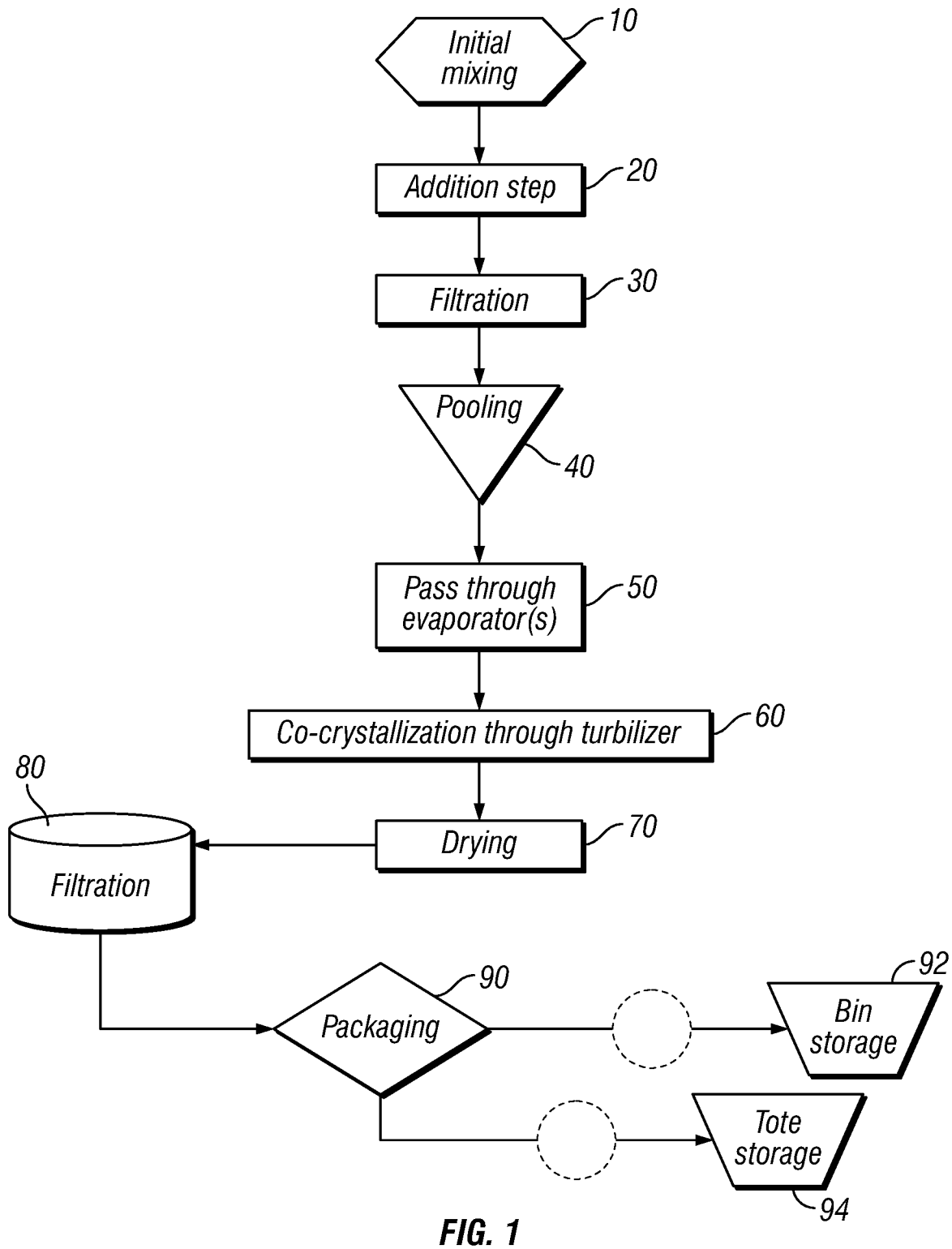
FIG. 1 illustrates a flow-chart generally illustrating the co-crystallization process in accordance with the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

The following definitions are provided in order to aid those skilled in the art in understanding the detailed description of the present invention.

The term "co-crystallization" as used herein means an encapsulation process which results in the generation of a co-crystal, that being a crystal built up out of two (or more) organic compounds that are, in their pure form, solid under ambient conditions, and which typically exhibit improved properties such as longer shelf life, dissolution rate/product solubility, bioavailability, and the like. In particular, the term "co-crystallization" as used herein is meant to refer to the described encapsulation process in which the crystalline structure of sucrose is modified from a perfect to an irregular, agglomerated crystal, so as to prove a porous matrix wherein a second ingredient, particularly a natural sweetener such as a *Stevia* glycoside or the like, can be incorporated in quantified amounts.

As used herein, the term "food grade" means material that conforms to the standards for foods deemed safe for human consumption, as set forth in the *Codex Alimentarius*, produced by the Codex Alimentarius Commission (CAC) (available online at: www.codexalimentarius.net).

The term "invert" or "invert syrup", as used herein, refers to those sucrose-based syrups (e.g., a glucose-fructose concentrated solution) resulting from the hydrolysis of sucrose into glucose, fructose, and residual sucrose, and that has a sugar content within the range of about 50° to about 70° Brix, of which at least 90% is a mixture of fructose and glucose. These syrups are produced with the glycoside hydrolase enzyme invertase or an equivalent enzyme, or an appropriate acid, which splits each sucrose disaccharide molecule into its component glucose and fructose monomer molecules; one of each. The general reaction which produces "invert syrup" is shown below.

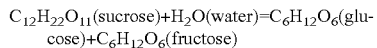

The term "natural sweetener" as used herein means any of a number of naturally occurring substances, or extracts from naturally occurring substances, that provide a high sweetness per unit mass and which provide little or no nutritive value. Preferably, the natural sweetener will have a sweetness per unit mass greater than that of natural sugar (sucrose). Examples of naturally occurring sweeteners suitable for use herein include, but are not limited to, extracts of the native South American plant *Stevia Rebaudiana* Compositae Bertoni, such as *Stevia*, steviol, *Stevia* glycosides, rebaudioside A-F, and dulcosides A and B, and related glycosides and triterpene glycosides from this plant; as well as other similar, naturally-occurring glycosides of the diterpene variety from these plants, as well as biologically active secondary metabolites and active compounds of plant origin having sweetening properties, such as those described by Kinghorn [*Journal of Natural Products*, Vol. 50 (6), pp. 1009-1024 (1987)], and salts, hydrates, and derivatives thereof which are suitable for consumption by mammals.

The term "sucrose", or "sugar", as used herein, means that compound having the general structure shown below, having the name α-D-glucopyranosyl-(1→2)-β-D-fructofuranose (a disaccharide composed of D-glucosyl and D-fructosyl monosaccharide moieties, and sometimes referred to as saccharose), and the molecular formula $C_{12}H_{22}O_{11}$, as well as salts, hydrates, and stereoisomers (e.g., D,L or L, D) thereof.

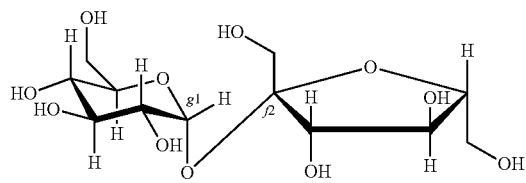

The term "brix," or "degrees Brix," as used herein, (and as represented by the symbol ° Bx), is meant to refer to a unit of measurement used in the food industry for measuring the approximate amount of the dissolved solids (sugar) as a sugar-to-water mass ratio of a liquid, typically expressed as a percent dissolved solids. It is typically measured with a saccharimeter that measures specific gravity of a liquid, or with a refractometer, such as the type having a crosshair reticule. For point of example, a 25° Bx solution is 25% (w/w), with 25 grams of sugar per 100 grams of solution. Or, to put it another way, there are 25 grams of sucrose sugar and 75 grams of water in the 100 grams of solution.

The term "Sensory Evaluation", as used herein, refers to a scientific discipline that applies principles of experimental design and statistical analysis to the use of human senses (sight, smell, taste, touch and hearing) for the purposes of evaluating consumer products. The discipline requires panels of human assessors, on whom the products are tested, and recording the responses made by them. By applying statistical techniques to the results it is possible to make inferences and insights about the products under test. It is characterized in detail in ASTM MNL14, and ICS 67.240— Sensory Analysis, both of which are incorporated herein by reference in their entirety as appropriate.

The phrase "free flowing powder composition", as used herein, is meant to refer to a powder of which the particles consist of a composition containing a plurality of solid particles at or about ambient (about 25° C.) temperature, wherein the particles do not adhere to one another. This may be alternatively and equivalently referred to as an "adhesionless" powder mixture, wherein the particles can move around independently, absent 'inter-particulate' forces [see, for example, the discussion and description of such free-flowing powders in "Particle-Particle Adhesion in Pharmaceutical Powder Handling" by Fridrun Podczeck, Imperial College Press, 1998, section. 3.1.3., pp. 111-114, incorporated herein by reference].

As used herein, all numerical ranges provided are intended to expressly include at least all of the numbers that fall within the endpoints of ranges.

Often, ranges are expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The term "optional" or "optionally" means that the subsequently described event or circumstance may or may not occur, and that the description includes instances where said event or circumstance occurs and instances where it does not. For example, the phrase "optionally substituted" means that the compound referenced may or may not be substituted and that the description includes both unsubstituted compounds and compounds where there is substitution.

Further, unless stated to the contrary, a formula with chemical bonds shown only as solid lines and not as wedges or dashed lines contemplates each possible isomer, e.g., each enantiomer and diastereomer, and a mixture of isomers, such as racemic or scalemic (mixtures of unequal amounts of enantiomers) mixtures.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions—that is, one or more parts of the process described herein, as well as the entirety of the process described herein, may be automated and run by one or more computer systems and their corresponding programs, such as an artificial intelligence program and using near-real time monitoring approaches. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Applicants have created improved, reduced-calorie sweetener products comprising sucrose (sugar) and a naturally-occurring sweetener, wherein the product exhibits a sweetness flavor, appearance, and physical parameter profile similar to natural sugar, yet simultaneously exhibit lower calories compared to natural sugar alone, and exhibit one or more distinctive analytical, identifying characteristics. Applicants have also created a process for manufacturing such a reduced-calorie sweetener product, using a process that includes the use of both invert syrup and a co-crystallization step.

Methods of Manufacture.

Turning now to the figures, FIG. 1 is an exemplary flowchart illustrating the general steps of the instant process. In the first step 10, a kettle is heated to an elevated temperature, preferably above about 70° C., such as in the range from about 70° C. to about 150° C. Optionally, and equally equivalent, the pre-heating step is omitted, and the ingredients are simply added to the kettle at ambient (e.g., about 25° C.) temperature, whereafter the mixture of all initial ingredients is then heated to an elevated temperature at or above 50° C., preferably at or above 60° C., such as from about 60° C. to about 150° C., as appropriate This is followed by addition step 20, wherein invert syrup, a natural sweetener (e.g., *Stevia* or rebaudioside A), and a sucrose solution, all at elevated temperature, are added to the kettle in a sequential manner. Preferably, the order of addition is to add the sucrose solution (heated or not) first, followed by the heated invert syrup, and finally the natural sweetener solution (or slurry, depending upon the product being added). These products are allowed to mix and return to a constant, elevated temperature above about 70° C., with stirring, at which point they are filtered at step 30, wherein the solution of invert, sucrose, and natural sweetener is transferred to and through an appropriate filter assembly. The filtered solution is then pooled (40) in a surge tank having an adjustable level, and the solution is then passed through one or more evaporator tubes (50) via pumping. The product then transfers to a turbilizer for the co-crystallization (60), whereupon a white, free-flowing powder results. The product co-crystallized powder then passes to a drying stage (70), followed by a further filtering step 80, wherein the co-crystallized product passes through a SWECO screen filter (or the equivalent) of varying mesh sizes. Following filtering step 80, the product proceeds to packaging step 90, wherein the product is stored in food-grade bins (92), or packed in food-grade totes (94) as appropriate, or it may be directly packaged in the end product deliverable to consumers, such as in tubs or individual serving size packets. While not shown in this general flow diagram, interspersed throughout the process are a variety of purity and control check points, including such added, optional steps as the exposure of the product stream to one or more magnets and/or metal detectors, to remove any metal debris or other metal contaminants that may be in the product stream as a result of the process.

Figure 2:
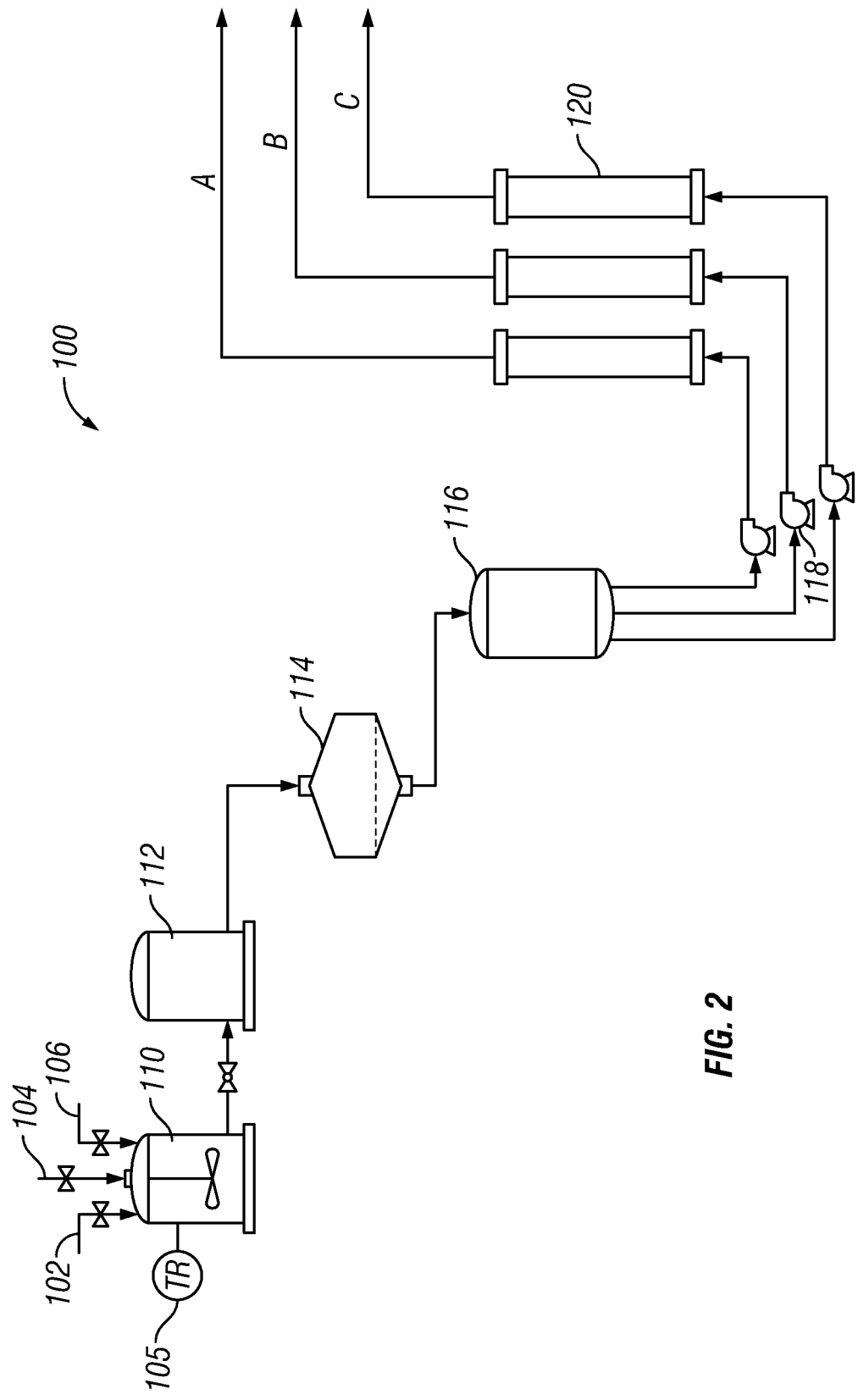
FIG. 2 illustrates a schematic illustration of a process in accordance with the present disclosure.
Figure 2:
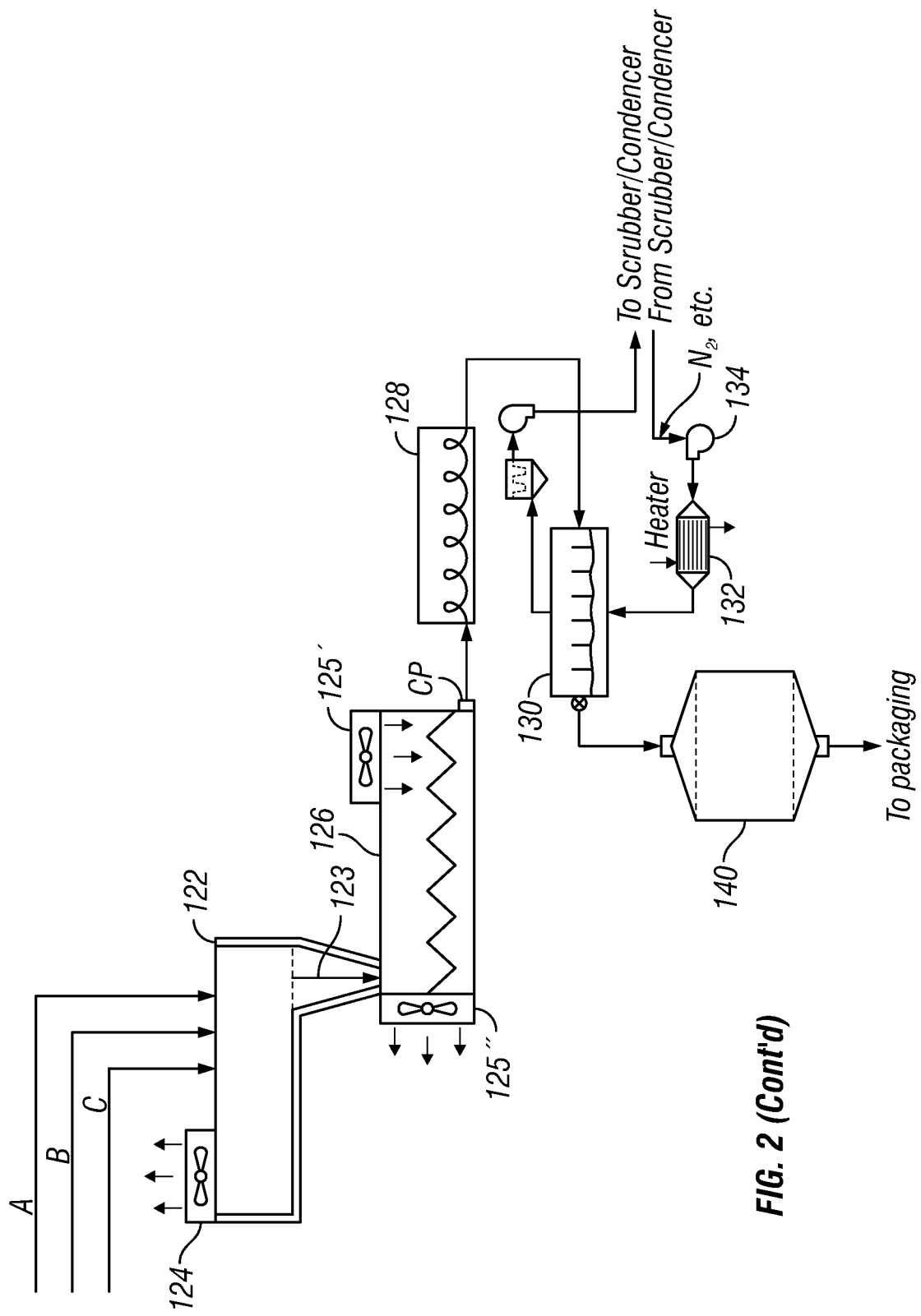

This general process outlined in FIG. 1 is illustrated in more detail in the process flow diagram of FIG. 2. While generally self-explanatory to one of skill in the art, the details of the process flow diagram will be discussed in detail. As illustrated therein, the process 100 starts with a kettle 110, which may be at ambient temperature (~25° C.), or may be heated to an elevated temperature, such elevated temperature ranging from about 50° C. to about 150° C., more preferably from about 60° C. to about 150° C., and more preferably from about 70° C. to about 90° C. To the kettle 110 is added a concentrated sucrose solution via primary sweetener stream 102 at ambient or elevated temperature (depending upon whether or not the kettle 110 is pre-heated or not), followed by an appropriate amount of an invert syrup via invert fluid stream 104. The sucrose solution may have a concentration from 50-96%, more preferably from about 85-90%, and a brix value corresponding to such concentration (e.g., a brix of about 67.5°). While it is preferred that the primary sweetener is sucrose, it is envisioned that the process will work equally well when the primary sweetener is glucose, fructose, or the like. Advantageously, it has been discovered herein that the use of the invert syrup in varied amounts (the amount determined by the type of sweetener used) is what contributes to and allows the sucrose and natural sweetener to crystallize appropriately in the co-crystallization process, with controlled size of the crystals in the final product (as well as producing a product with bulk density, flowability, and other characteristics substantially similar to those of sucrose, as will be described in detail below). Following addition of the invert to the kettle 110 containing a concentrated sucrose solution, a solution of one or more natural sweeteners is added at a controlled rate of solution via natural sweetener fluid stream 106. The controlled addition of invert and/or the natural sweetener may be drop-wise, or in another controlled rate of fluid addition, so as to not generate undesirable exotherms within the kettle 110. An option temperature recorder (TR) 105 may be associated with the kettle 110 so as to record and monitor temperature of the composition within the kettle, as well as mixer speed and addition flow rate. Thereafter, the temperature of the mixture of sucrose, invert, and natural sweetener within kettle 110 is either allowed to return to the target elevated temperature, e.g., between about 70° C. to about 90° C., or about 80° C., and then allowed to equilibrate, or (in the event the kettle was not pre-heated), is raised to an elevated temperature within the kettle 110 as described above, with mixing.

The natural sweetener suitable for use with the processes of the present disclosure can be any known, natural, non-caloric sweetener of the family Asteraceae (Compositae) which is safe for use in human food products, or a derivative thereof, having a sweetness as measured by a human tasting panel of at least 50 times that of sucrose. Preferably, in accordance with aspects of the present disclosure, the natural sweetener is a glycoside or polyol, preferably one of several terpenoid glycoside, polyol extracts of *Stevia rebaudiana* (Bertoni) which are classified as natural sweeteners, including but not limited to steviol, steviolbioside, stevioside, rebaudioside A (Reb A), rebaudioside B, rebaudioside C (dulcoside B), rebaudioside D, rebaudioside E, rebaudioside F, and dulcoside A, as well as other steviol glycosides, the general chemical structures of which are shown below. More preferably, the natural sweetener used in the co-crystallized products of the present disclosure is stevioside (which is about 200 times sweeter than sucrose) or rebaudioside A (which is approximately 200-300 times sweeter than sugar, and has a sweetening power similar to that reported for aspartame, provides zero calories, and has a clean, sweet taste, as described by Prakash, et al, Food and Chemical Toxicology, Vol. 46, pp. S75-S82 (2008); and, Kinghorn, A. D., et al., in "Naturally Occurring Glycosides", John Wiley & Sons, pp. 399-429 (1999)). The natural sweetener or sweeteners can be used in purified form, substantially purified (from about 90% to about 99% pure) form, in isolated form, or in the form of a botanical extract comprising the sweetness enhancing active compounds. The natural sweetener may be obtained from a variety of sources, including by chemical synthesis, by biotechnological processes including fermentation, or isolated from a natural source, in particular a botanical natural source (including, without limitation, fruits, leaves, bark, and roots of a source), for example a plant extract or syrup.

The natural sweeteners used in the processes and products of the present disclosure can be used as a single, sweetness enhancing component in a concentration as described herein, or in a formulation containing from about 0.00001 wt./wt. % to about 25 wt./wt. % of at least one natural sweetener. In accordance with further aspects of the present disclosure, the amount of co-crystallized natural sweetener to the amount of sucrose or other natural sweetener in a product may be in the ratio of from about 1:1,000 to about 1:100, inclusive, including from about 1:700 to about 1:100, inclusive, the ratio depending upon the target end calorie reduction measure of the end product.

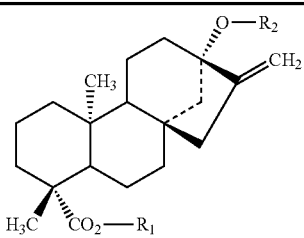

| No. | Compound Name | $R_1$ | $R_2$ |
|---|---|---|---|
| 1 | Steviol | H | H |
| 2 | steviolbioside | H | β-Glc-β-Glc (2 → 1) |
| 3 | stevioside | β-Glc | β-Glc-β-Glc (2 → 1) |

-continued

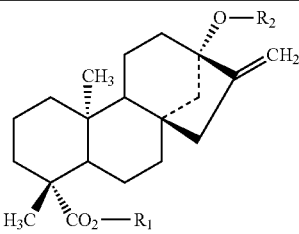

| No. | Compound Name | $R_1$ | $R_2$ |
|---|---|---|---|
| 4 | rebaudioside A | β-Glc | β-Glc-β-Glc (2 → 1)<br>β-Glc (3 → 1) |
| 5 | rebaudioside B | H | β-Glc-β-Glc (2 → 1)<br>β-Glc (3 → 1) |
| 6 | rebaudioside C | β-Glc | β-Glc-α-Rha (2 → 1)<br>β-Glc (3 → 1) |
| 7 | rebaudioside D | β-Glc-β-Glc (2 → 1) | β-Glc-β-Glc (2 → 1)<br>β-Glc (3 → 1) |
| 8 | rebaudioside E | β-Glc-β-Glc (2 → 1) | β-Glc-β-Glc (2 → 1) |
| 9 | rebaudioside F | β-Glc | β-Glc-β-Xyl (2 → 1)<br>β-Glc (3 → 1) |
| 10 | dulcoside A | β-Glc | β-Glc-α-Rha (2 → 1) |

The amounts of sucrose, natural sweetener, and invert used in the production of the co-crystallized, reduced calorie sweetener product produced by the methods described herein will vary depending upon the target product, and the calorie reduction target of that product. In example, the product can have a 33% caloric reduction, a 35% caloric reduction, a 42.5% caloric reduction, a 50% caloric reduction, and a 75% caloric reduction, and caloric reductions within the range of from about 30% caloric reduction to about 80% caloric reduction, inclusive and without limitation, e.g., a caloric reduction of about 45% or 62%.

With continued reference to FIG. 2, after the solution of sucrose, invert and natural sweetener has equilibrated to the initial process temperature $T_1$ within kettle 110, the hot solution is conveyed to a holding tank 112 for further mixing for a period of time, and is then passed through a filter 114, such as a filter mesh having a mesh size of about 60. Although a screen filter is illustrated, any other appropriate filter may be used at this step in the process. Optionally, and in accordance with a further aspect of the present disclosure, the filtering step may be completely skipped via a bypass system of valving. Thereafter, the filtered product stream (still hot) is fed to a surge tank 116, preferably a surge tank having an adjustable level and associated level sensors. The surge tank 116 preferably has an inlet for connecting to fluid transfer means, and an opposite surge tank liquid effluent outlet. The surge tank 116 is used to absorb any sudden drops or increases of flow from the previous equipment in the process, so that the next equipment (such as pumps 118) won't dry and suffer a cavitation effect, and so that the flow out of the tank 116 will be substantially stable. An optional speed/flow rate controller (not shown) may be included between the filter 114 and the surge tank 116. After exiting the surge tank 116, the fluid stream is drawn through one or more flow lines (A, B, and C) via an equivalent number of process pumps 118 to and through at least one heated evaporator 120 (3 are shown, the number depending in part on efficiency and the amount of excess moisture to be removed), and then to a water-jacketed holding tray 122. The evaporators 120 may be spinning disk, heated wall, ultrasonic, indirectly heated, or electrically heated evaporators, or evaporators that are combinations thereof, such as spinning disk/heated wall evaporators. Holding tray 122 preferably includes a fan 124 to aid in drawing additional excess moisture away from the fluid stream. The viscous product mixture then passes through a jacketed chute 123 at one end of the tray to the inlet of a turbilizer 126 having a fan 125' and vacuum 125" set up as shown (vacuum 125" placed near the product stream inlet, and the fan 125' located near the oppositely-spaced product stream outlet), blowing air across the length of the turbilizer 126. Turbilizer 126 may be any appropriate such heat-exchange device or high-speed continuous mixer (e.g., continuous, high-shear paddle mixers) as known in the art, such as those available from Bepex International, LLC (Minneapolis, Minn.). As the product passes through the turbilizer 126, the fan and vacuum arrangement has a simultaneous cooling and evaporating effect as the product stream flows from the input end to the output end. As the product mixture slowly passes through the turbilizer, the product co-crystallizes out with continuous air cooling and simultaneous moisture evaporation. The time of residence within the turbilizer may be controlled by the speed of the turbilizer so as to effect the rate of co-crystallization. The co-crystallized product (CP) exits the turbilizer 126 at the output as a substantially white or off-white, free-flowing powder. The co-crystallized product (CP) then passes through a screw conveyor 128 to a fluid-bed dryer 130 having an associated heater 132 and pump 134 (or the equivalent drying apparatus), whereafter the co-crystallized product is filtered through a filter assembly 140 containing at least two (2) sized filters of differing mesh size, e.g., the first filter can be of 12 mesh, and the second filter can be of 54 mesh, without limitation, so as to produced a sized, co-crystallized product. The sizes of the mesh may be appropriately selected to provide the desired size end product. This sized product may then be packaged or stored as appropriate, such as in totes, bins, or directly into the final packaging, such as single-serve packets or bulk (e.g., 2-5 pound) containers.

Reduced-Calorie Sweetener Product.

The product of the process described above is a co-crystallized sucrose-natural sweetener product of reduced calories, the product having physical and flavor profiles similar to pure sugar, as well as exhibiting several unique characteristics as a result of the co-crystallization process. For example, the co-crystallized product preferably has one or more of the following physical, measurable characteristics similar to pure sucrose, the characteristics including but not limited to bulk density, flow characteristics, mean density, tap density, brittle fracture index, and compressibility. In particular, the co-crystallized product exhibits an angle of repose (AOR, the angle between the horizontal and the slope of a heap of granular material dropped from a designated elevation and corresponding to the flow properties of the material) ranging from about 10° to about 50°, and more preferably from about 20° to about 45°, inclusive, more preferably less than about 40°.

Further, the co-crystallized natural sweetener products of the present disclosure exhibit positive sweet taste modifier or enhancer properties, and the results of such assays correlate reasonably well with actual sweet taste perceptions in mammals, particularly humans, as shown and confirmed, at least for a number of products as prepared in accordance with the present disclosure, by human taste testing. Such human taste testing experiments can be well quantified and controlled by tasting the candidate compounds in aqueous solutions, as compared to control aqueous solutions, or alternatively by tasting the co-crystallized natural sweetener products of the present invention in actual food compositions. Examples of human taste test experiments in the form of both aqueous solutions that can be a model for sweet beverage compositions, and actual examples of comestible compositions such as ice cream, barbeque sauce, and cookies can be found hereinbelow.

Preferred natural sweet taste modifiers in accordance with one aspect of the present disclosure are co-crystallized natural sweetener products which are identified when a modified comestible has a sweeter taste than a control comestible that does not comprise the co-crystallized natural sweetener product, as judged by the majority of a panel of at least five human taste testers. The co-crystallized natural sweetener products prepared in accordance with the processes of the present disclosure can be identified, for example, when a water solution comprising a sweet tasting amount of a known sweetener selected from the group consisting of sucrose, fructose, glucose, erythritol, sorbitol, xylitol, aspartame, saccharin, acesulfame-K, Sucralose, alitame, Truvia®, or a mixture thereof, and a co-crystallized natural sweetener product prepared in accordance with the present disclosure, are either mixed together or tasted separately, and the co-crystallized natural sweetener product has a sweeter taste than a control water solution comprising the sweet tasting amount of the known sweetener, as judged by the majority of a panel of at least five human taste testers. In such taste test experiments, the sucrose would be present at a concentration of about 3.4 grams/100 milliliters (mL) of water (or, about 8 grams of sugar/238 grams of water), and the compounds being tested would also be present in 800 gram batches, as shown in the example tasting sample preparation details of FIG. 6.

Additionally, the co-crystallized product resultant from the above-captioned process exhibits unique physical, identifying characteristics, including DSC (differential scanning calorimetry) profile, powder X-ray diffraction profile, crystal structure as viewed under scanning electron microscopy (SEM), flowability as measured by the Angle of Repose (AOR), and sweetness flavor profile, all of which can be shown experimentally, as presented herein below, and may be determined using known test methods. For example, the bulk flow properties of the co-crystallized products prepared in accordance with the present disclosure may be determined using Jenike shear cells as delineated in standard testing method D6128 (ASTM, 2000), while the handling characteristics of the co-crystalline product, particularly with regard to their flow and flood characteristics in bins and hoppers, as delineated by the determination of Carr indices and set forth in ASTM standard method D6393 (ASTM, 1999), and as detailed by Ganesan, et al. [*Transactions of the ASABE,* 51(2), 591-601(2008)] and Yang, et al. [*Powder Technology,* 158 (1-3), 21-33 (2005)]. Spectroscopically, the co-crystallized sucrose/natural sweetener products prepared in accordance with the present disclosure preferably exhibit an XRPD (X-ray powder diffraction) profile having one or more distinct peaks within the range of from about 10 to about 27 degrees 2 Theta (+/−5 degrees), and more preferably an XRPD profile with at least one peak at about 20 degrees 2 Theta (+/−5 degrees).

Further, the process disclosed herein allows for the manufacture of target, reduced calorie co-crystallization products, ranging from about 25% to about 75% sugar reduction, as desired. By "reduced calorie sugar reduction", it is meant that the product has a reduction in calories due to a reduced amount of sugar (or sucrose), but still retains the full sugar sweetness profile. For example, a 75% calorie reduction means that the product has the sweetness/flavor profile of pure sugar, but contains only 25% sugar; or, equivalently, 1 gram of 75% reduced calorie product has the same sweetness as 4 grams of pure sugar. Suitable exemplary reduced-calorie formulations in accordance with the present disclosure include about 25%, about 33%, about 35%, about 50% and about 75% calorie reductions, inclusive.

Using Co-Crystallized Products to Prepare Comestible Compositions

Those of ordinary skill in the art of preparing and selling comestible compositions (i.e., edible foods or beverages, or precursors or flavor modifiers thereof) are well aware of a large variety of classes, subclasses and species of the comestible compositions, and utilize well-known and recognized terms of art to refer to those comestible compositions while endeavoring to prepare and sell various of those compositions. Such a list of terms of art is enumerated below, and it is specifically contemplated hereby that the various species of the co-crystallized natural sweetener products having reduced calories, as described herein, could be used to modify or enhance the sweet flavors of the following list comestible compositions, either singly or in all reasonable combinations or mixtures thereof: one or more confectioneries, chocolate confectionery, tablets, countlines, bagged selflines/softlines, boxed assortments, standard boxed assortments, twist wrapped miniatures, seasonal chocolate, chocolate with toys, alfajores, other chocolate confectionery, mints, standard mints, power mints, boiled sweets, pastilles, gums, jellies and chews, toffees, caramels and nougat, medicated confectionery, lollipops, liquorices, other sugar confectionery, gum, chewing gum, sugarized gum, sugar-free gum, functional gum, bubble gum, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savory biscuits and crackers, bread substitutes, breakfast cereals, family breakfast cereals, flakes, muesli, other cereals, children's breakfast cereals, hot cereals, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, dairy products, milk, fresh/pasteurized milk, full fat fresh/pasteurized milk, semi skimmed fresh/pasteurized milk, long-life/uht (ultra-high temperature processed) milk, full fat long life/uht milk, semi-skimmed long life/uht milk, fat-free long life/uht milk, goat milk, condensed/evaporated milk, plain condensed/evaporated milk, flavored, functional and other condensed milk, flavored milk drinks, dairy only flavored milk drinks, flavored milk drinks with fruit juice, soy milk, sour milk drinks, fermented dairy drinks, coffee whiteners, powder milk, flavored powder milk drinks, cream, cheese, processed cheese, spreadable processed cheese, unspreadable processed cheese, unprocessed cheese, spreadable unprocessed cheese, hard cheese, packaged hard cheese, unpackaged hard cheese, yoghurt, plain/natural yoghurt, flavored yoghurt, fruited yoghurt, probiotic yoghurt, drinking yoghurt, regular drinking yoghurt, probiotic drinking yoghurt, chilled and shelf-stable desserts, dairy-based desserts, soy-based desserts, chilled snacks, snack bars, granola bars, breakfast bars, energy bars, fruit bars, other snack bars, sauces, hot sauces, barbeque sauces, dressings and condiments, tomato pastes and purees, chocolate spreads, nut-based spreads, and yeast-based spreads.

Preferably, the co-crystallized natural sweetener compounds prepared in accordance with the present disclosure can be used to modify or enhance the sweet flavor of one or more of the following subgenuses of comestible compositions: confectioneries, bakery products, ice creams, dairy products, snack bars, frozen foods, sauces, or a mixture thereof. In some favored aspects of the inventions described herein, one or more of the co-crystallized natural sweetener compounds prepared in accordance with the present disclosure can be added to ice creams, breakfast cereals, bakery items, and sauces, ideally so as to enable the reduction in concentration of previously known saccharide sweeteners, or artificial sweeteners, and provide a comestible composition having reduced calories.

In general an ingestible composition will be produced that contains a sufficient amount of at least one compound co-crystallized natural sweetener compounds prepared in accordance with the present disclosure, or its various subgenuses described hereinabove, to produce a composition having the desired flavor or taste characteristics such as favorable "sweet" taste characteristics.

Typically at least a sweet flavor modulating amount, a sweet flavoring agent amount, or a sweet flavor enhancing amount of one or more of the co-crystallized natural sweetener compounds prepared in accordance with the present disclosure will be added to the comestible, optionally in the presence of other known sweeteners, so that the sweet flavor modified comestible product has an increased sweet taste as compared to the comestible product prepared without the co-crystallized natural sweetener, as judged by human beings or animals in general, or in the case of formulations testing, as judged by a majority of a panel of at least five human taste testers, via procedures described elsewhere herein.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Characterization Methods

X-RAY Powder Diffraction.

Analyses are carried out on an X-ray powder diffractometer using Cu K alpha (Cu-k-α) radiation, or the equivalent. The instrument is preferably equipped with a long fine focus X-ray tube. The tube voltage and amperage are set at typical values, e.g., about 40 kV and 40 mA, respectively. The divergence and scattering slits are set at 1° and the receiving slit is set at 0.15 mm. Diffracted radiation is detected by a NaI scintillation detector or the equivalent. A theta-two theta continuous scan at 2-3°/min (0.4 sec/0.02 step) from 2.5 to 40° 2θ is preferably used, although scans may also be taken over a range within this range (e.g., between 10 and 27 2θ degrees (Bragg angle)) at an appropriate step rate (e.g. 0.04 degrees). A silicon standard is typically analyzed to check the instrument alignment. Samples were prepared for analysis by placing them in an aluminum/silicon sample holder, using methods known to those of skill in the art. For example, approximately 1.5 g of sample can be placed into 20 mm pans, and then further prepared as appropriate.

Differential Scanning Calorimetry (DSC).

DSC data are acquired using TA Instruments DSC 2910 or equivalent instrumentation. The instrument is calibrated using standard methods, such as using indium as the reference material. In a typical procedure, a sample with a weight between 2 and 6 mg is placed into a standard aluminum DSC pan with an open or crimped lid configuration, and the weight accurately recorded. An empty pan is placed in the reference position. The calorimeter cell is closed and a flow of nitrogen (at a flow rate of about 50 cc/min) is passed through the cell. The sample cell is equilibrated at 25° C., and the heating program is set to heat the sample under a nitrogen purge at a heating rate of about 10° C./min, up to an appropriate final temperature, e.g., about 350° C., or about 200° C., as appropriate. When the run is completed, the data are analyzed using the DSC analysis program in the system software. The melting endotherm is integrated between baseline temperature points that are above and below the temperature range over which the endotherm is observed. The data reported are the onset temperature, peak temperature and enthalpy.

DSC is also used to obtain melting points for the polymorphs and co-crystalline products produced herein, as well as the glass transition temperatures ($T_g$) of both pure sucrose, pure natural sweetener (e.g., Rebaudioside-A), and the co-crystallized product formed in accordance with the methods described herein. Typically, glass transition temperatures are obtained using samples that are not crystallized, although this is not required.

Because amorphous forms of the co-crystallized sweetener product may be present in some samples, when an additional endotherm is observed in the DSC curves that can be due to enthalpic relaxation of the amorphous phase present, modulated DSC (MDSC) can be used to confirm that the extra endotherm is not due to melting of an impurity. MDSC uses a sinusoidal or modulated change in the heating rate instead of a single linear heating rate, as used in the traditional DSC. This allows the heat flow to be separated into reversible and nonreversible components. The glass transition of amorphous material is detected in the reversible heat flow curve as a change in the baseline, due to a change of the heat capacity of the sample.

DSC data were acquired using a TA Instruments DSC Q1000 (TA Instruments, Newcastle, Del.). Between 2 and 50 mg of sample, e.g., 20 mg, is weighed into an open pan. This pan is then crimped and placed in the sample position in the calorimeter cell. An empty pan is placed in the reference position. The calorimeter cell is closed and a flow of nitrogen (at a flow rate of about 55 cc/min) is passed through the cell. The heating program is set to heat the sample at a heating rate of ranging from about 1° C./min to about 20° C./min, with a modulation period of 60 seconds and modulation amplitude of +/−0.1° C. The final temperature is chosen to be 200° C. When a run has been completed, the data are analyzed using the DSC analysis program in the system software. The melting endotherm in the total heat flow curve is integrated between baseline temperature points that are above and below the temperature range over which the endotherm is observed. The data reported are the onset temperature, peak temperature and enthalpy. When a change of the baseline of the reversible heat flow curve is observed due to a glass transition, the data reported are the onset temperature, midpoint temperature, endset temperature and heat capacity change.

$^1$H and $^{13}$C NMR Spectroscopic Analysis.

The co-crystallized products generated using the methods described herein may be further characterized by their proton and carbon-13 nuclear magnetic resonance (NMR) spectra. One-dimensional (1D) $^1$H and $^{13}$C NMR spectra of samples were obtained at 500 and 125 MHz, respectively, using a Bruker Advance III 500 NMR spectrometer equipped with a BBFO probe heat, at ambient temperature (~22° C.). In addition, the co-crystallized product having a 35% and 75% caloric reduction compared to natural sucrose or cane sugar was analyzed by two-dimensional (2D) {$^1$H, $^{13}$C} HSQC (Heteronuclear Single Quantum Coherence) spectroscopy. Chemical shifts (both for $^1$H and $^{13}$C) are referenced to 2,2,3,3-d$_4$-3-trimethylsilyl propionate (TSP), added in a small amount (10 mL of 2% solution in D$_2$O) to the sample (δ CH$_3$=0 ppm).

Samples were prepared as follows: aliquots of the samples (~50 mg of a 35% reduced calorie sample, labeled as Crystal-35; 241 mg of a 75% reduced calorie sample, labeled as Crystal-75; ~5 mg of Rebaudioside A, 97; 0.5 mL of liquid sucrose (LS); and 0.5 mL of liquid invert (LI)) were dissolved in (c.q. mixed with) 0.7 mL D$_2$O. The resulting samples were transferred into 5-mm NMR tubes, and analyzed as set out above.

Measurement of Powder Flowability.

The powder flow properties of the product are classified using at least the measurement of the Angle of Repose (AOR), static or dynamic. In further accordance with the present disclosure, the Carr index, EAIF (Effective Angle of Internal Friction), and/or the MTA (Mean Time to Avalanche) of the powder, alone or in combination, can be used to evaluate the overall flow properties of the co-crystallized sucrose/natural sweetener products. In determining the experimental values of the AOR, a Mark 4 AOR testing device (available from Powder Research Ltd., UK) or the equivalent may be used. In an exemplary procedure, a representative sample of the co-crystallized sucrose/natural sweetener product to be tested (100 grams is the preferred mass) is weighed out on a scale, and placed in a beaker. If the powder appears to be free flowing, the 100 g sample is poured slowly and gently on to the upper converging chute of the testing device. If the powder shows signs of cohesiveness or reluctance to flow, a vibratory motor may be actuated, so that the powder flows down the upper chute, into the metal hopper, and onto the lower sloping chute that directs the powder against the vertical wall. The semi-cone of powder formed should have a well-defined, sharp apex. The angle between the baseboard and the backplate are then measured and recorded.

The co-crystallized natural sweeteners produced by the process described herein exhibited an Angle of Repose (AOR) measured as detailed above ranging from about 10° to about 50°, and more preferably from about 20° to about 45°, inclusive, more preferably less than about 40°.

Characterization Data.

Figure 3:
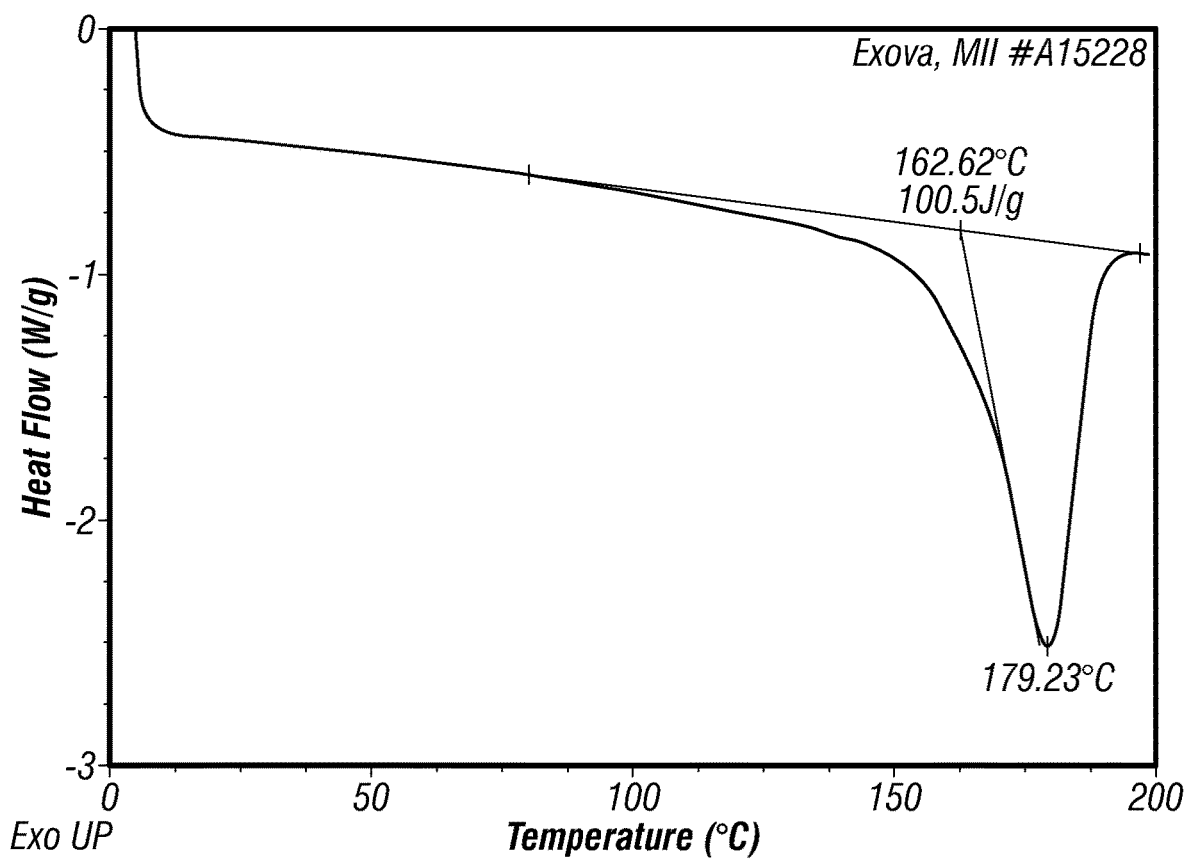
FIG. 3 illustrates a typical DSC curve of a co-crystallized natural sweetener product prepared in accordance with the present disclosure.

FIG. 3 illustrates a typical DSC curve of a co-crystallized, non-solvate product (Crystal-75). The endotherm with an extrapolated onset temperature of 162.62° C. in FIG. 3 is likely due to melting (or a crystalline-amorphous phase transition). The DSC thermogram in FIG. 3 exhibits a very pronounced endothermic peak around 179° C. for the co-crystallized product prepared in accordance with the present disclosure, which is notably lower than that expected for a pure, crystalline sucrose product, which is reported to be exhibit a sharp melting endotherm at around 188° C. [see, Eggleston, G., et al., *Journal of Agricultural and Food Chemistry*, Vol. 44, pp. 3319-3325 (1996); and, Beckett, S. T., et al., *Carbohydrate Research*, Vol. 341, pp. 2591-2599 (2006)].

Figure 4A:
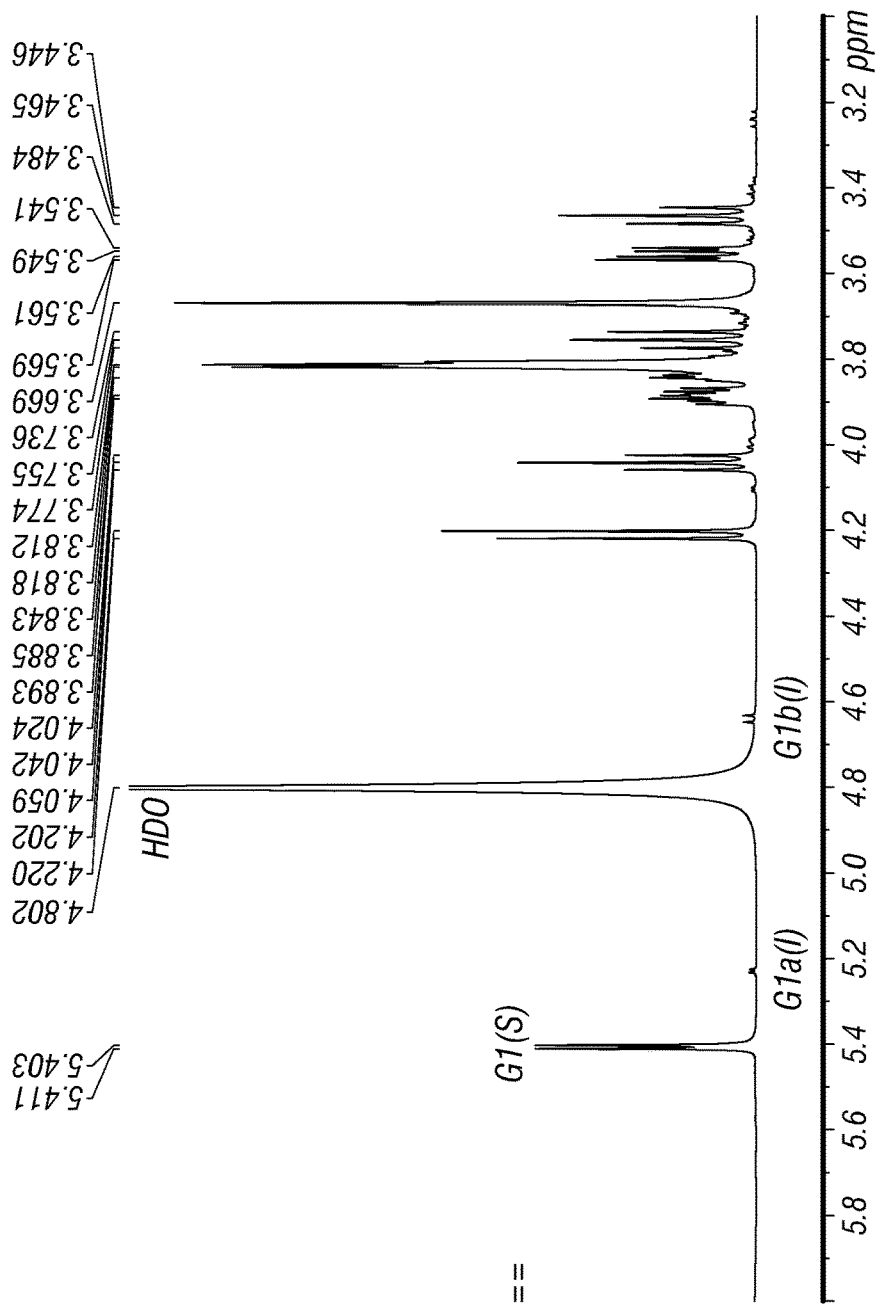
FIG. 4A illustrates a typical proton ($^1$H) nuclear magnetic resonance (NMR) spectrum of a co-crystallized natural sweetener product prepared in accordance with the present disclosure.
Figure 4B:
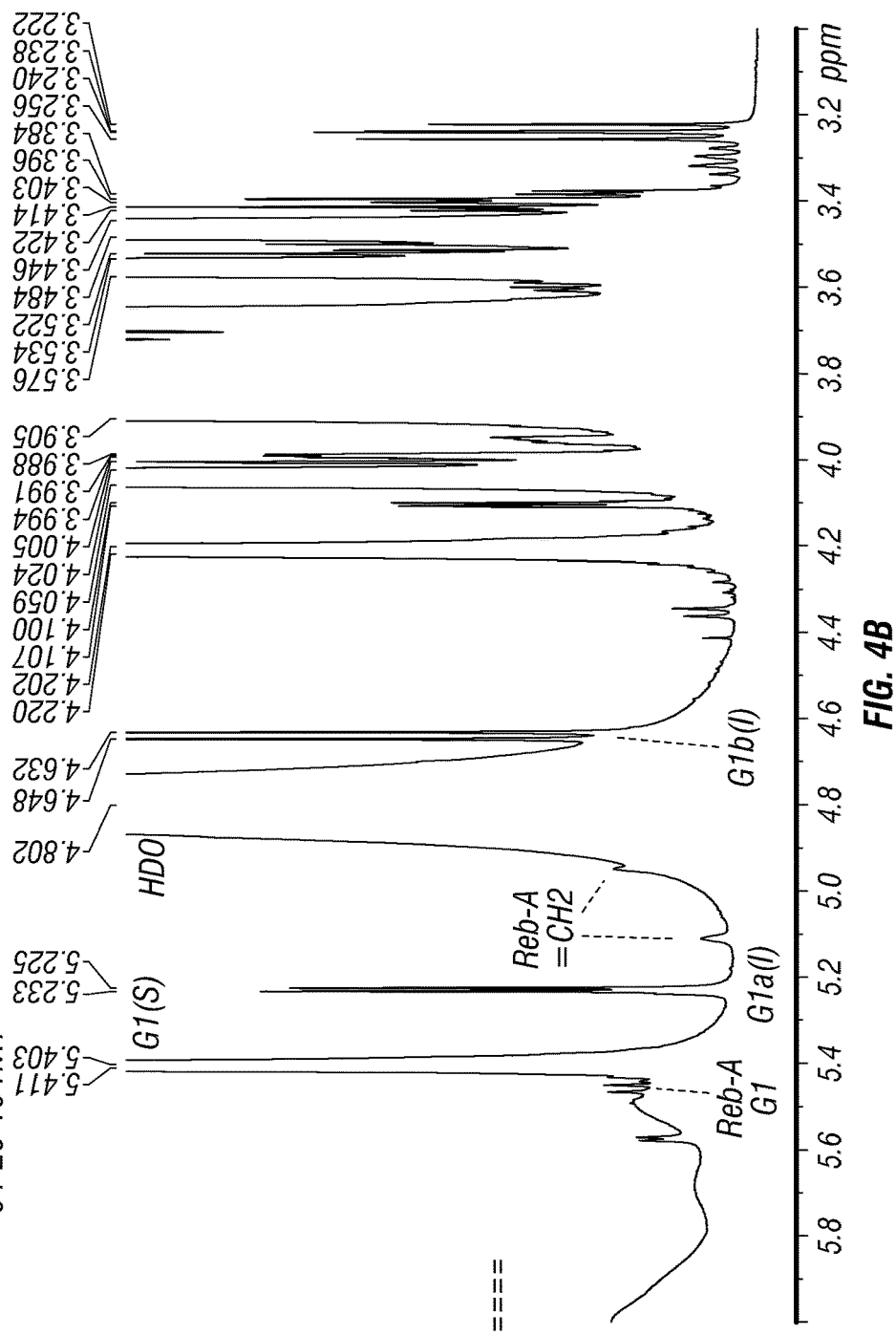
FIG. 4B illustrates an expanded region of the $^1$H-NMR spectrum of FIG. 4A.

FIG. 4A shows a typical proton ($^1$H) NMR spectrum of the co-crystallized 75% caloric reduction product (Crystal-75). FIG. 4B shows an expanded region of the spectrum of FIG. 4A, showing selected details from about 5.8 to about 3.1 ppm. The co-crystalline product exhibits characteristic signals with chemical shift values (ppm) of about 5.48, about 5.40, about 5.22, about 5.1, and about 4.94, with the peaks at about 5.10 and about 4.94 being characteristic of the =CH$_2$ functional group on Rebaudioside A.

Figure 5:
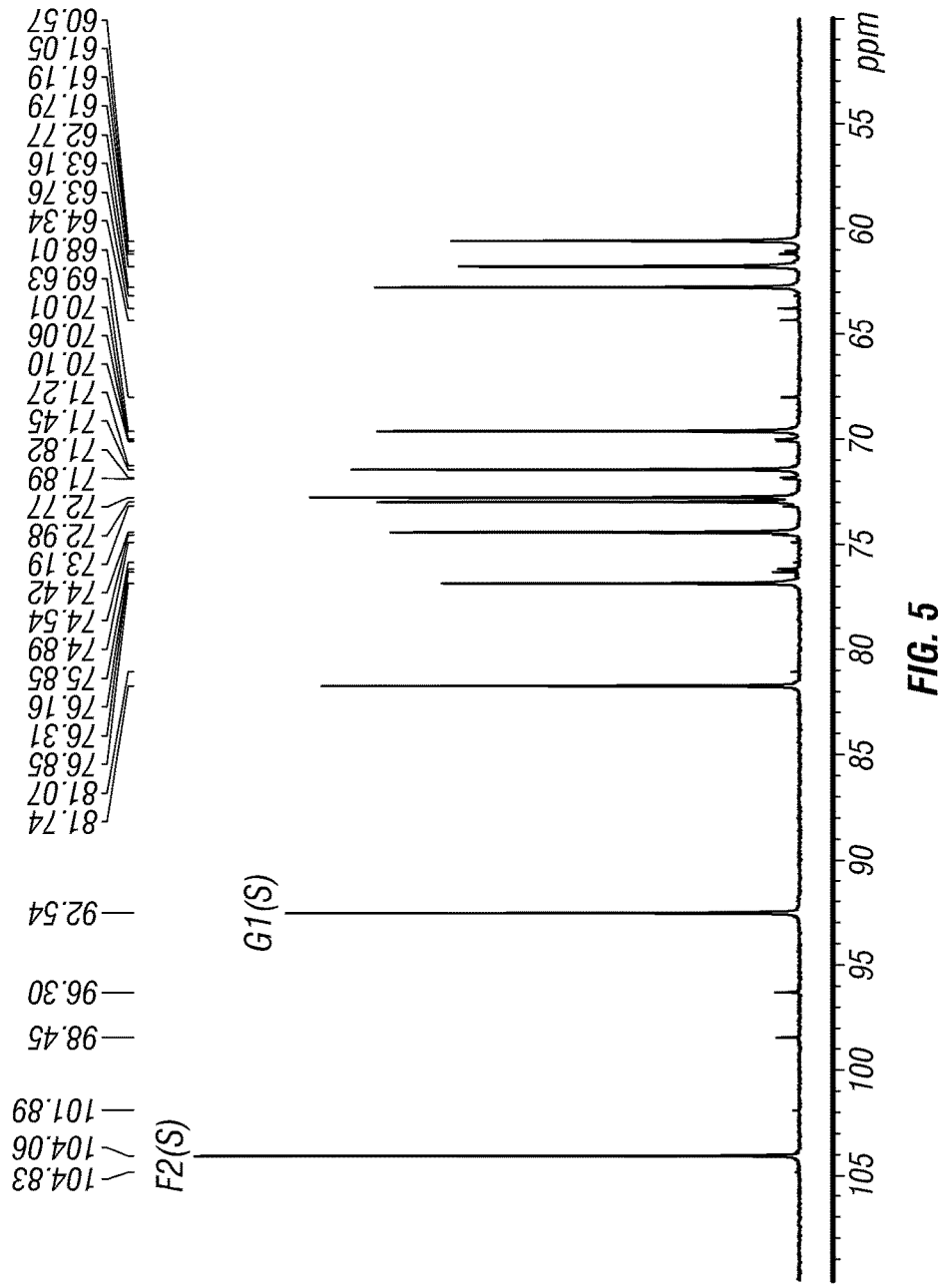
FIG. 5 illustrates a typical carbon-13 ($^{13}$C) nuclear magnetic resonance (NMR) spectrum of a co-crystallized natural sweetener product prepared in accordance with the present disclosure.
Figure 7:
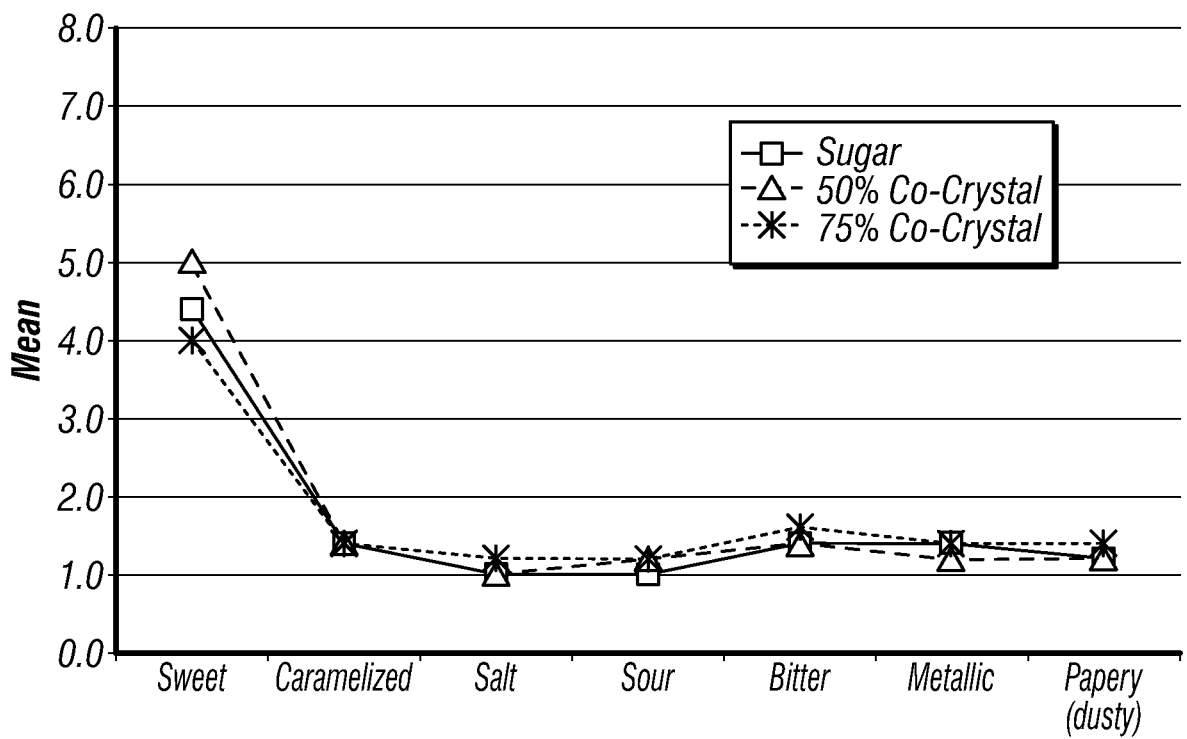
FIG. 7 illustrates a first exemplary flavor profile comparison chart of pure sugar (—■—), a 50% co-crystallization product (—*—), and a 75% co-crystallization product (—*—) prepared in accordance with the presently described process.
Figure 8:
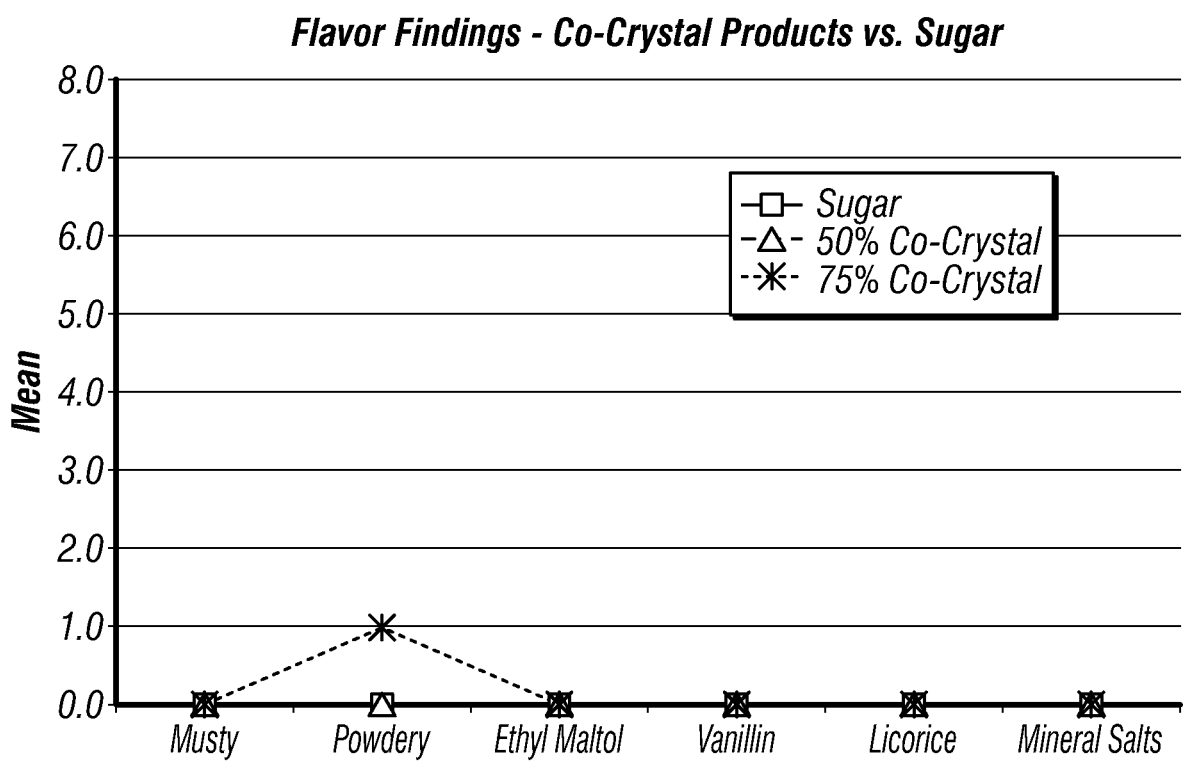
FIG. 8 illustrates a second exemplary flavor profile comparison chart of pure sugar (—■—), a 50% co-crystallization product (—*—), and a 75% co-crystallization product (—*—) prepared in accordance with the presently described process.
Figure 9:
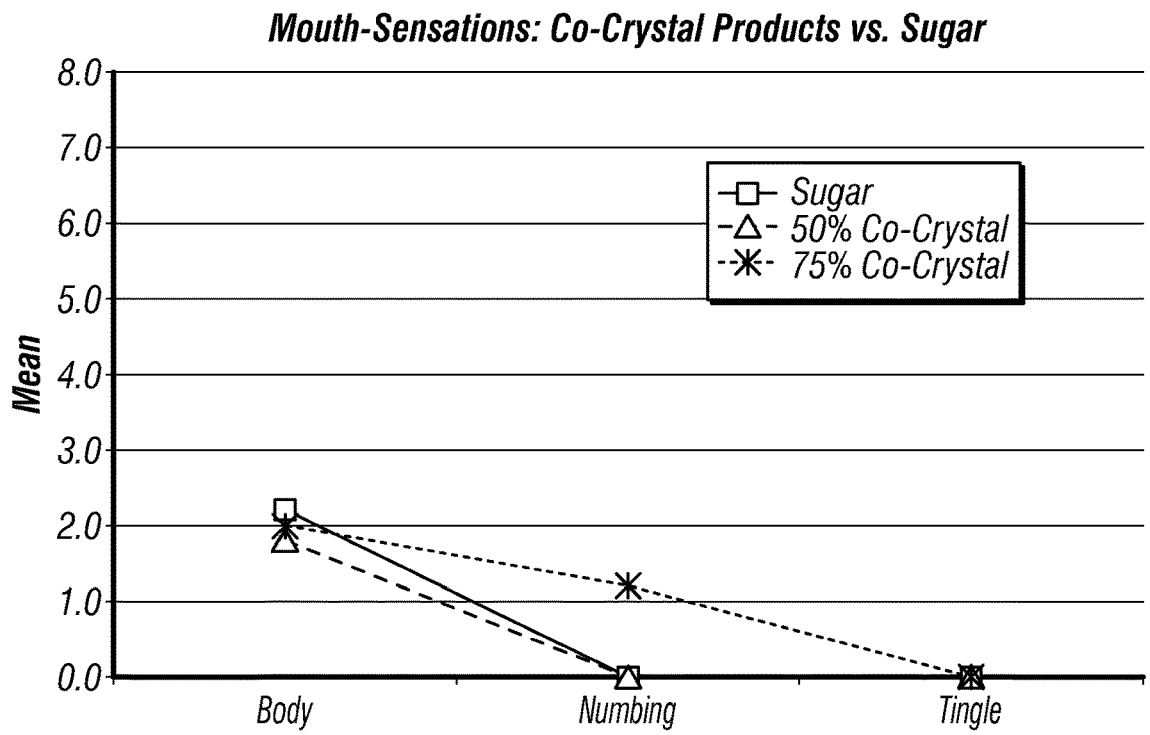
FIG. 9 illustrates a mouth sensation flavor profile comparison chart of pure sugar (—■—), a 50% co-crystallization product (—*—), and a 75% co-crystallization product (—*—) prepared in accordance with the presently described process.
Figure 10:
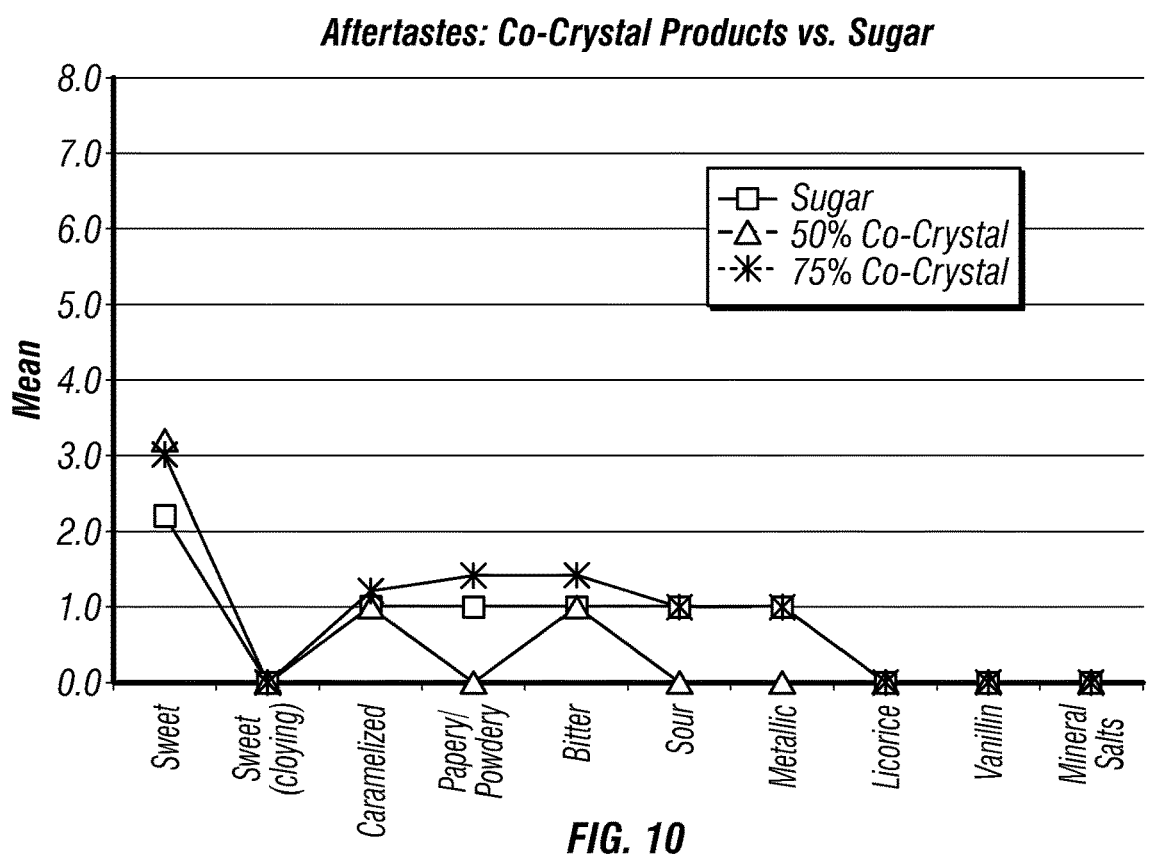
FIG. 10 illustrates the aftertaste flavor profile comparison chart of pure sugar (—□—), a 50% co-crystallization product (—*—), and a 75% co-crystallization product (—*—) prepared in accordance with the presently described process.
Figure 11:
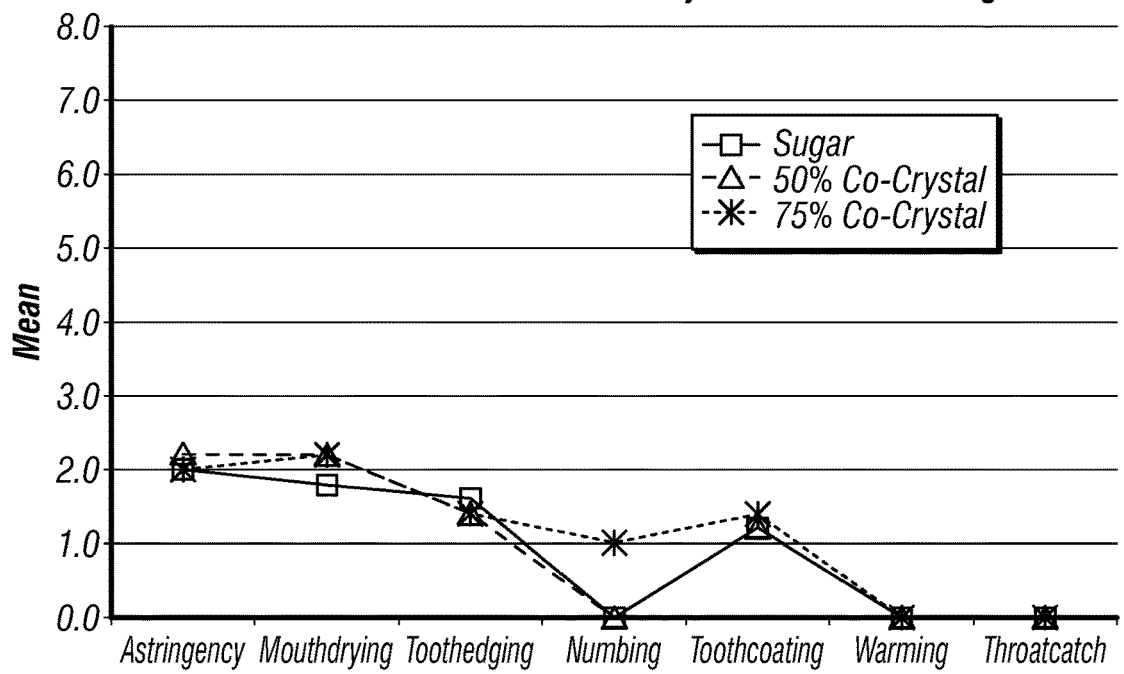
FIG. 11 illustrates the residual mouth-sensation flavor profile comparison chart of pure sugar (—□—), a 50% co-crystallization product (—*—), and a 75% co-crystallization product (—*—) prepared in accordance with the presently described process.
Figure 12:
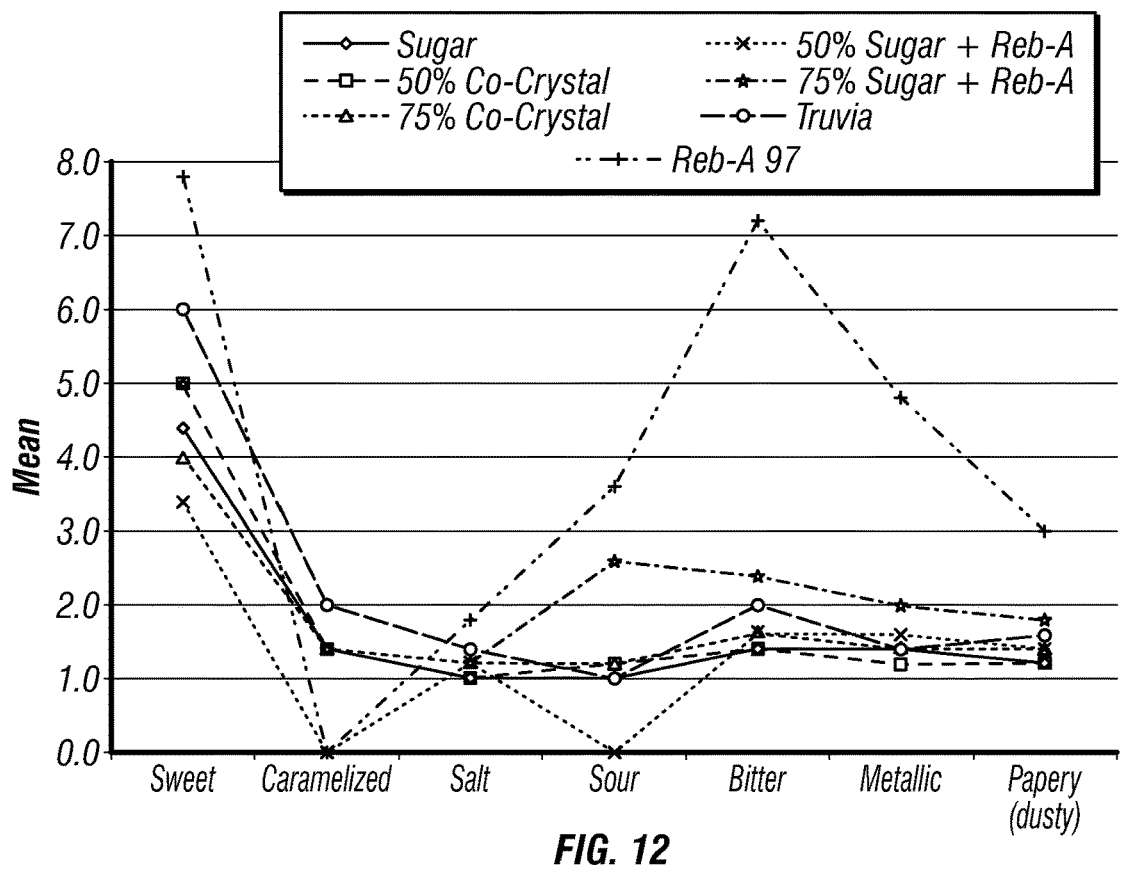
FIG. 12 illustrates a graph of the sucrose flavor characteristics for all of the tested products in the taste comparison testing.
Figure 13:
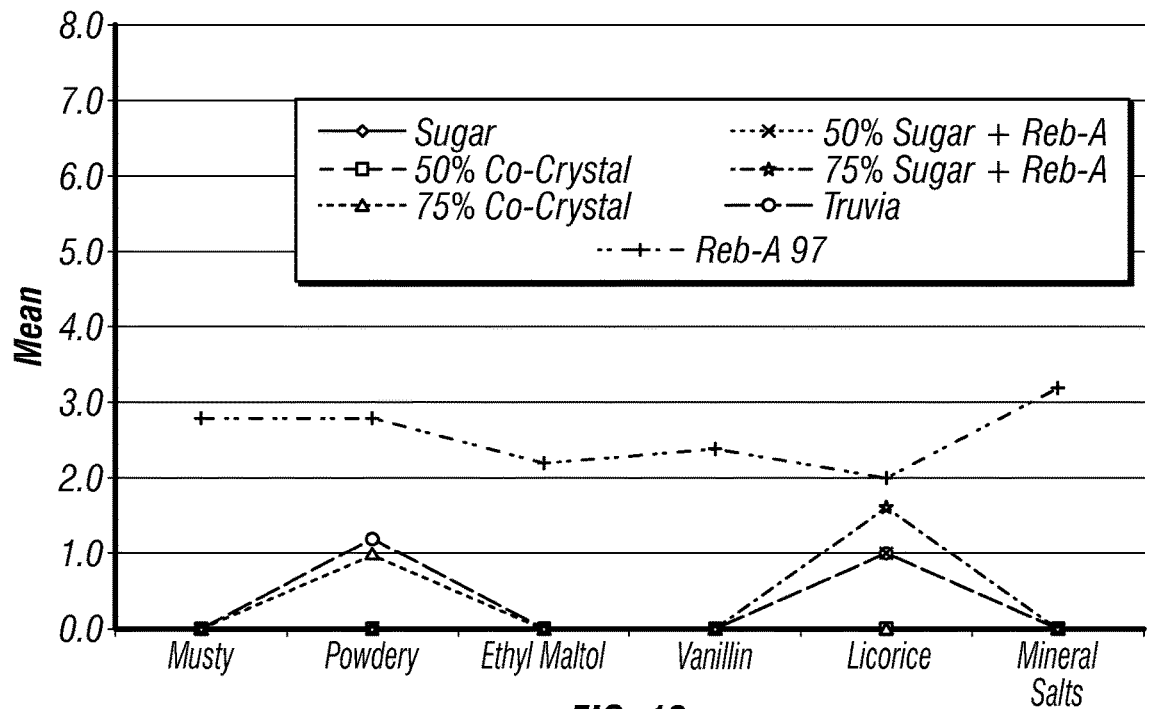
FIG. 13 illustrates a graph of the non-sucrose flavor characteristics for all of the tested products in the taste comparison testing.
Figure 14:
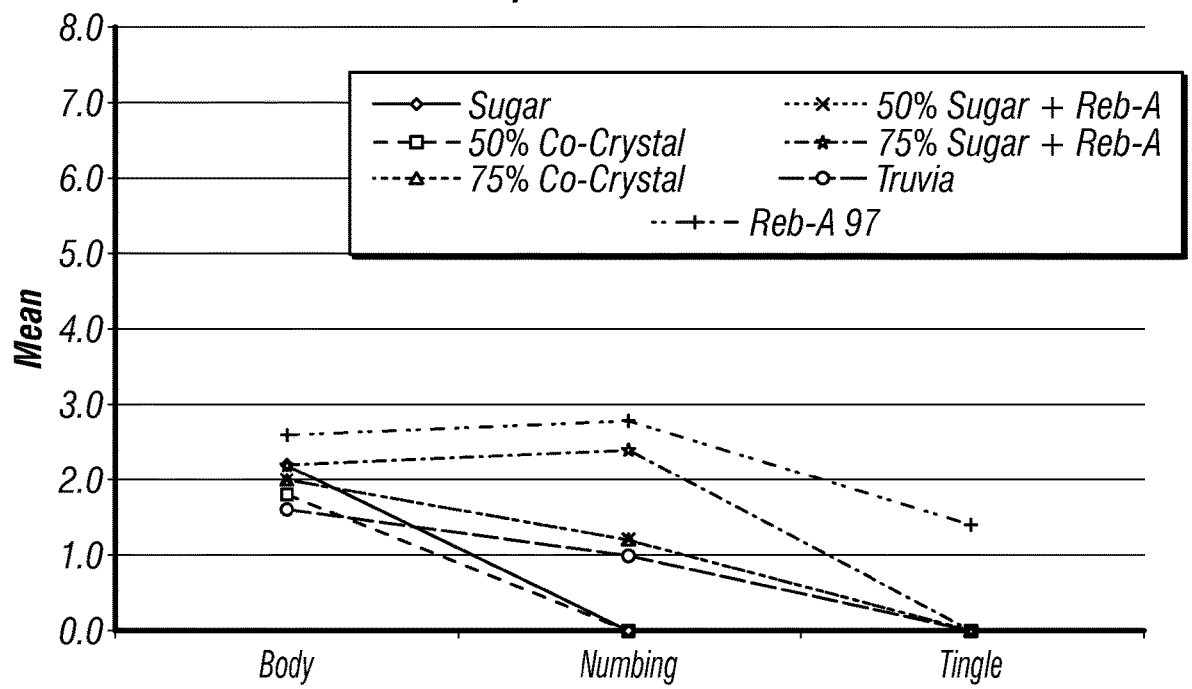
FIG. 14 illustrates a graph of the resultant mouth sensation characteristics for all of the tested products in the taste comparison testing.
Figure 15:
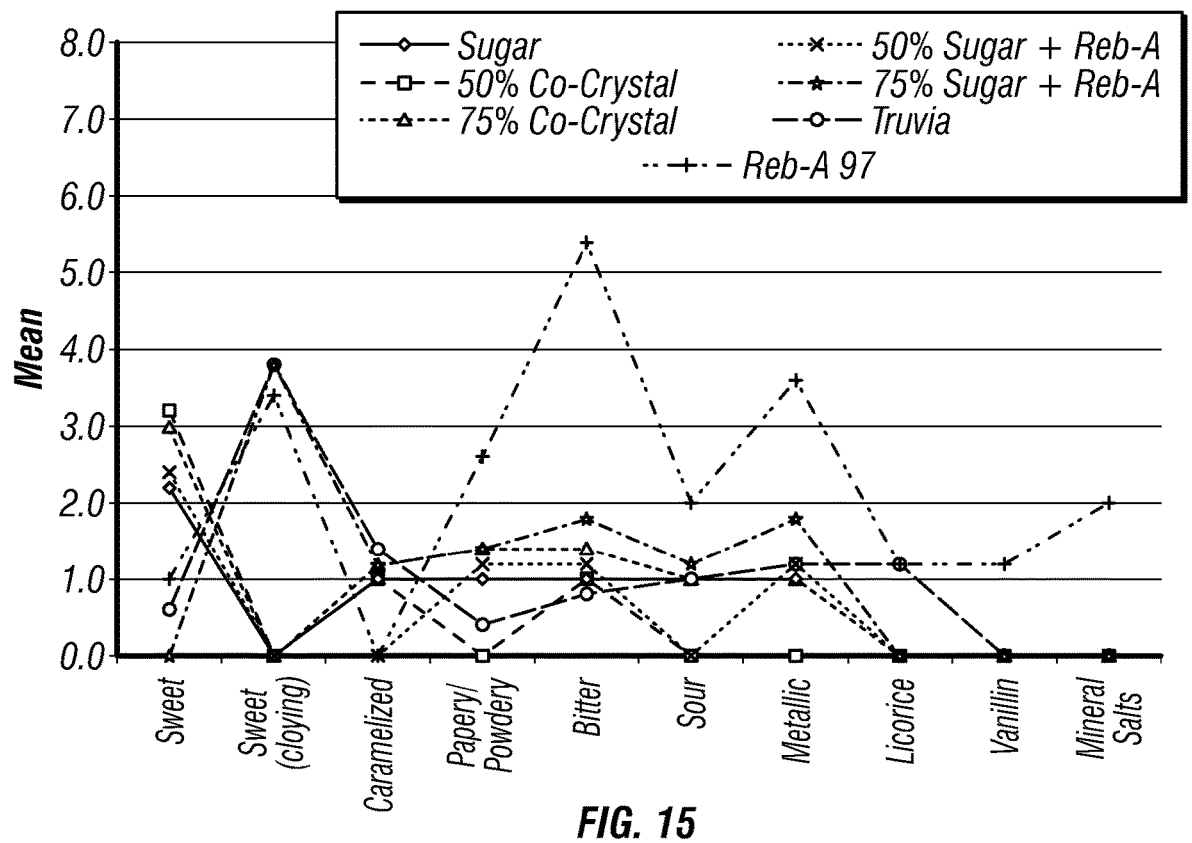
FIG. 15 illustrates a graph of the resultant aftertaste characteristics (30 seconds post-ingestion) for all of the tested products in the taste comparison testing.
Figure 16:
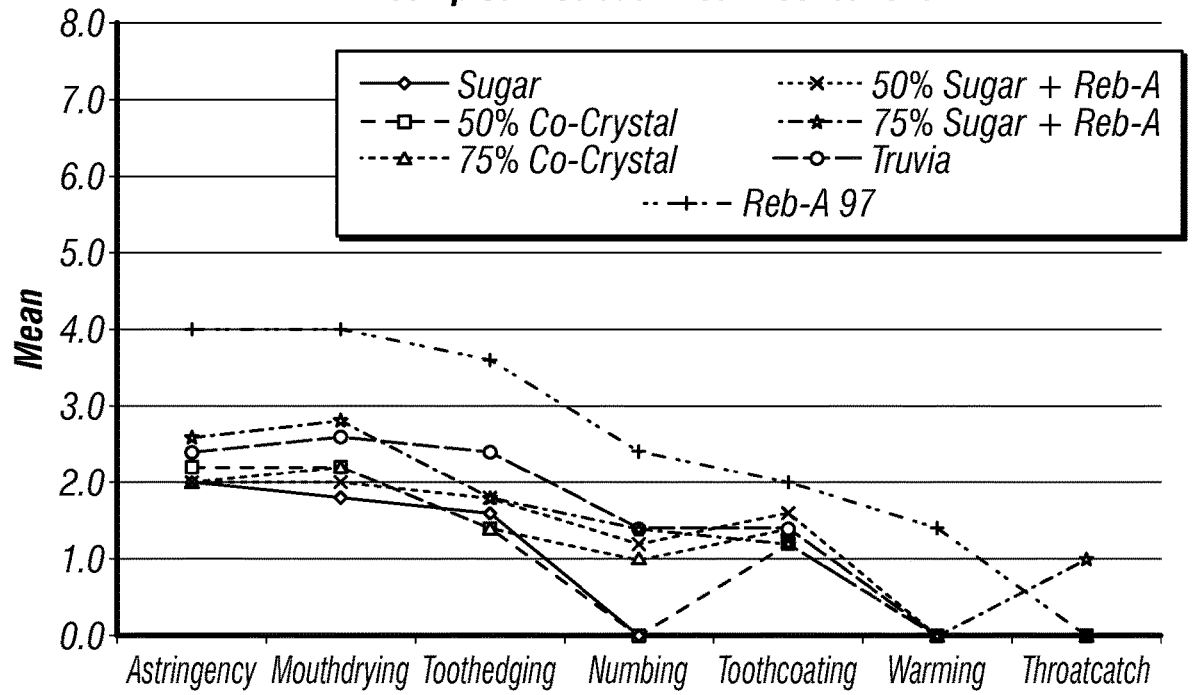
FIG. 16 illustrates a graph of the resultant residual mouth-sensation characteristics for all of the tested products in the taste comparison testing.

FIG. 5 shows a typical carbon-13 ($^{13}$C) NMR spectrum of the co-crystallized 75% caloric reduction product (Crystal-75). The co-crystalline product exhibits characteristic signals with chemical shift values (ppm) of about 104.8, about 104.1, about 101.9, about 98.4, about 96.3, about 94.4, and about 92.5. The peak at about 104.8 is characteristic of the =CH$_2$ functionality in Rebaudioside A; the peak at about 104.1 is characteristic of the anomeric F2-carbon in sucrose; and, the peak at about 92.5 is characteristic of the anomeric G1 carbon in sucrose. The co-crystallized 35% caloric reduction product (Crystal-35) exhibited similar carbon-13 chemical shifts (with a shift (ppm) of about 104.6 for the =CH$_2$ functionality).

Taste Testing.

A panel of trained and experienced descriptive panelists (Food Marketing Support Services, Inc.) tasted, described and documented sensory behavior of selected sweetener compositions in water at ambient (room) temperature. The sweetener samples tested were: sugar (100%; Imperial Sugar); Truvia (100%), a consumer brand *Stevia* sweetener containing a mixture erythritol and Rebiana; Reb-A 97 (100%; Pure Circle), a sugar (75% reduction)—rebaudioside A blended or granulized mixture; a sugar (50% reduction)—rebaudioside A blended or granulized mixture; a sugar/rebaudioside A co-crystallization product in accordance with the instantly described process and the resultant product with a 50% calorie reduction (Co-Crystal (50% Reduction)); and, a sugar/rebaudioside A co-crystallization product in accordance with the instantly described process and the resultant product with a 75% calorie reduction (Co-Crystal (75% Reduction). These samples were prepared as shown in the Tables in FIG. 6.

Sample Preparation: On the day of the testing panel, a predetermined weight of sugar or sweetener was weighed out. Water (238.0 g; Evian®) at a temperature of 68-72° F. was weighed into a quart glass vessel. The sugar and sweeteners were each added to the individual, pre-weighed vessels of water, covered, and mixed until all the solids had dissolved. Approximately 90 mL (3 oz.) of each solution was poured into 150 mL glass beakers, and the beakers covered with watch glasses for service, so as to prevent evaporation and change in concentration. Blind-coded solutions were randomized prior to presentation to the tasting panelists.

Tasting Protocol:

The beaker is gently swirled five (5) times, and the watch glass cover is removed. The testor sips the sample 1-3 times for flavor and mouth-feel assessments, and swallows at least once. Sweetness was evaluated relative to standardized concentrations of sucrose in water. Samples were also evaluated for character nuances and quantifying attribute intensities such as residual mouth sensations and aftertastes, using a 12-point scale. To rate aftertastes and residual mouth feelings, the panel will sip and swallow as a group, and the panel will indicate a 30-second elapsed time marker, after which the panelists rate the aftertastes and mouth-sensations. Panelists cleanse their pallets between samples with water and unsalted crackers; the elapsed time between samples is 20 minutes. The flavor findings for both the co-crystallized products prepared in accordance with the present disclosure compared with sugar are shown graphically in FIGS. 7-11, while the flavor characteristics of all samples tested are summarized in the comparison graphs in FIGS. 12-16.

Color Testing.

Color and turbidity were measured as the absorbance at 420 nm and calculated according to the official ICUMSA method GS2/3-9 (1994). Typically, samples (5 g) were diluted in triethanolamine/hydrochloric acid buffer (pH 7) and filtered through a 0.45 μm filter prior to analysis.

Example 1

Process for Preparing a 30% Calorie Reduction Sweetener Product

A solution of sucrose (67.5 Brix), 432.21 g was heated in a kettle to 75-80° C., and a 68% solution of invert (34.242 g; about 71 Brix) that had been elevated to temperature separately was added, with stirring. To this mixture was added 97% pure rebaudioside A (0.560 g, PureCircle) in solution, the addition being done in controlled fashion so as to maintain the temperature within the kettle at 75° C.+/−5° C. The mixture was maintained at temperature for a period of time, after which the mixture was co-crystallized in accordance with the procedure outlined herein. The product had a taste profile substantially similar to that of pure sugar.

The lab production example from above was repeated on a larger production scale using 2,115.18 lbs of sucrose, 167.58 lbs. of invert, and 2.74 lbs. of 97% pure rebaudioside A. The co-crystallized product exhibited nearly identical results. Additional reduced calorie co-crystallization products were prepared in accordance with the procedure described herein, and are summarized below in Table 1. Some of the initial testing data for these experiments, in particular the color value testing data, is shown in Table 2, below. As can be seen from the color value testing, a co-crystallized product prepared in accordance with the process of the present disclosure using sucrose and 97% Reb-A (rebaudioside A, PureCircle) gave a color value closest to EFG (extra-fine granulated sugar). The tasting data analysis of these examples was conducted as described above, and is presented in the data shown in the FIGS. 7-16 accompanying this disclosure. As can be seen from this data, the 97% rebaudioside A (Reb-A) samples exhibited the most extreme flavor profile across the array, compared with pure sugar (sucrose), as expected. It differed not only in note intensities, especially bitterness, but carried with it many more non-sucrose characteristics such as licorice, cloying sweet aftertaste, and a relatively extreme residual mouth-numbing sensation. In contrast, the data shows that the co-crystallization product samples (rebaudioside/sucrose co-crystallization products prepared in accordance with the processes of the present disclosure) most closely resembled sugar in flavor, mouth-sensations, and aftereffects, in comparison with the products tested. These results are shown in the graphs presented in FIGS. 7-16.

TABLE 1

Summary of Co-Crystallization Experiments at varying calorie reductions.

| Calorie Reduction (%) | Sucrose (60-67.5 Brix) | Invert (100% @ 71 Brix) | Reb A (97%) | Stevia (95%) | Ratios of sucrose to: Reb A | Stevia 95 |
|---|---|---|---|---|---|---|
| 25 | 483.84 g. | 19.166 g. | | 0.540 g | | 896:1 |
| 25 | 540 g | 38.332 g. | | 0.540 g | | 1000:1 |
| 33 | 432.21 g | 17.121 g. | 0.560 g | | 772:1 | |
| 35 | 419.33 g | 16.611 g. | | 0.756 g | | 555:1 |
| 50 | 322.56 g | 12.777 g. | | 1.080 g | | 299:1 |
| 75 | 180.0 g | 12.777 g. | 1.620 g | | 111:1 | |

TABLE 2

Initial Color Test Results.[1]

| Sample | ICUMSA Color | EFG |
|---|---|---|
| Stevia-95 co-crystal product | | 45 |
| 25% calorie reduction | 345 | |
| 35% calorie reduction | 119 | |
| 50% calorie reduction | 305 | |
| 75% calorie reduction | 88 | |
| Reb-A, 97% co-crystal product | | |
| 25% calorie reduction | 53 | |
| 35% calorie reduction | 337 | |
| 50% calorie reduction | 577 | |
| 75% calorie reduction | 525 | |

[1]Color values after a single test at 420 nm. No duplicate runs made.

Example 2

Preparation of Reduced Calorie Comestible Products

A. Barbeque sauce.

In a medium-sized sauce pan or equivalent cooking vessel, ½ of a minced onion, 4 cloves of minced garlic, and ¼ cup orange juice were combined in a pan. The mixture was simmered on a stove for about 10 minutes, until the onion is translucent in color. Black pepper (½ teaspoon), salt (½ tablespoons), 2 cups of ketchup, ¼ cup tomato paste, ⅓ cup cider vinegar, ¼ cup Worcestershire sauce, ¼ cup Light or Dark Brown Sugar (Imperial Sugar) and ⅓ teaspoons hot sauce were mixed into the pan. To this mixture was added ⅛ of a cup of the co-crystallized natural sweetener of the present disclosure, comprising 97% Reb-A (Steviacane®), and the mixture was brought to a boil. The heat was then reduced to a medium low, and the mixture allowed to simmer for 20 minutes. The mixture was then cooled and tasted.

B. Vanilla Ice Cream

In a small saucepan or equivalent cooking vessel, 12 ounces of evaporated milk and ½ cup of the co-crystallized natural sweetener of the present disclosure, comprising 97% Reb-A (Steviacane®) was gently stirred until the Steviacane was dissolved. The mixture was removed from the heat, and ½ cup of pasteurized egg product, 1½ teaspoon vanilla, and 7 ounces of sweetened, condensed milk was added to the mixture. This was the ice cream base. For each batch of ice cream, 1½ cups of base, 1½ cups of whole milk and ½ cup heavy cream was added to an ice cream maker. The ice cream was then frozen, and once done, the ice cream had the consistency of soft serve ice cream. The ice cream was placed in container and frozen to harden, and thereafter was taste tested.

C. Drop Sugar Cookies.

An oven was pre-heated to 375° F. Unsalted butter (1 cup), 2 eggs, 2 teaspoons vanilla, and ½ cup of the co-crystallized natural sweetener of the present disclosure, comprising 97% Reb-A (Steviacane®) was then creamed together. Separately, 2¼ cups all-purpose flour, ½ teaspoon baking soda, 1 teaspoon salt, and ½ teaspoon cream of tartar were combined together, and then this combined mixture was stirred into the creamed mixture.

Spoonfuls of the mixture were then dropped onto a greased cookie sheet, and were then flattened with the back of a spoon. The cookies were then baked 8-10 minutes, until the edges were golden brown. The cookies were thereafter tasted by a tasting panel and evaluated.

D. Blueberry Muffins.

Cake flour (12½ ounces), baking soda (1 teaspoon), salt (¼ teaspoon), and baking powder (2 teaspoons) were sifted together in a bowl. In a separate mixing bowl, vegetable oil (½ cup), 1 egg, 1 cup plain yogurt, and ½-cup of the co-crystallized natural sweetener of the present disclosure, comprising 97% Reb-A (Steviacane®) were whisked together. The dry ingredients were added to this second, wet mixture, and the two mixed together until just combined. Blueberries (1½ cups) were then folded into the mixture. Muffin tins were greased, filled to approximately ⅔ capacity with the batter, and then baked in a pre-heated oven at 400° F. for 20-25 minutes. The muffins were thereafter tasted by a tasting panel and evaluated.

Sensory Evaluation.

The above comestible food products were evaluated by tasters using a rank rating system. The tasters used an anchored scale, ranging from a low value (no sweetness) to a high value (intense sweetness), and the samples for testing were randomly coded. After tasting all of the products detailed above, made with the co-crystallized natural sweeteners of the present disclosure, compared with the same products made with pure sugar (sucrose) in place of the reduced-calorie natural sweetener described herein, the food samples made with the co-crystallized natural sweeteners of the present invention exhibited substantially the same sweetness and flavor as the full, sugar-containing control comestibles.

Other and further embodiments utilizing one or more aspects of the inventions described above can be devised without departing from the spirit of Applicant's invention. For example, steps may be added to the co-crystallization procedure, or equipment may be modified or replaced by equivalently-functioning process manufacturing equipment. Further, the various methods and embodiments of the natural co-crystallized sucrose/natural sweetener products and processes for manufacture described herein can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A process for the preparation of a sucrose and natural sweetener co-crystallized product, the process comprising:
   preparing a solution of sucrose in water;
   contacting the sucrose solution with an invert syrup at a temperature from about 70° C. to about 90° C. to generate a heated sucrose/invert solution,
   adding a natural sweetener solution to the heated sucrose/invert solution in a controlled rate of addition at a temperature from about 70° C. to about 90° C. so as to produce an admixture of sucrose, invert syrup and natural sweetener;
   heating the admixture of sucrose, invert syrup and natural sweetener to a temperature between about 70° C. and 90° C. with mixing for a period of time;
   passing the heated admixture through a heated evaporator; and
   producing a natural sweetener that consists essentially of the co-crystallized sucrose/natural sweetener product with a particle size between 100 and 2000 microns by co-crystallizing the heated solution mixture using a controlled, co-crystallization process with simultaneous air cooling and vacuum evaporation under reduced pressure conditions.

2. A process for the preparation of a co-crystallized sucrose/natural sweetener product, the process comprising:
   preparing a solution of sucrose in water;
   contacting the sucrose solution with an invert syrup to generate a sucrose/invert solution, adding a natural sweetener solution to the sucrose/invert solution so as to produce an admixture of sucrose, invert syrup and natural sweetener;
   heating the admixture of sucrose, invert syrup and natural sweetener with mixing for a period of time; and
   producing the co-crystallized sucrose/natural sweetener product with a particle size between 100 and 2000 microns by co-crystallizing the heated admixture using a controlled, co-crystallization process with simultaneous air cooling and vacuum evaporation under reduced pressure conditions.

3. A process for the preparation of a co-crystallized sucrose/natural sweetener product, the process comprising:
   contacting a sucrose solution with an invert syrup and a natural sweetener to produce an admixture of sucrose, invert syrup and natural sweetener;
   heating the admixture of sucrose, invert syrup and natural sweetener for a period of time; and
   producing the co-crystallized sucrose/natural sweetener product with a particle size between 100 and 2000 microns by co-crystallizing the heated admixture using a controlled, co-crystallization process comprising simultaneous air cooling and vacuum evaporation under reduced pressure conditions.

4. The process of claim 3, wherein the natural sweetener is a terpenoid glycoside or polyol extract of *Stevia rebaudiana* (Bertoni).

5. The process of claim 4, wherein the natural sweetener is selected from the group consisting of *Stevia*, steviol, steviolbioside, stevioside, rebaudioside A, rebaudioside B, rebaudioside C, rebaudioside D, rebaudioside E, rebaudioside F, and dulcoside A.

6. The co-crystallized sucrose/natural sweetener product produced in accordance with the process of claim 3, the co-crystallized product being a dry powder with particles characterized by the following properties:
   i) an exhibited powder flowability with an angle of repose (AOR) of about 45° or less;
   ii) a DSC curve with an andothermic peak at about 179° C.; and
   iii) an X-ray powder diffraction (XRPD) profile having peaks at about 10 to 27 degrees 2 Theta (+/−5 degrees).

7. The co-crystallized sucrose/natural sweetener product of claim 6, wherein the XRPD profile further has one peak at about 20 degrees 2 Theta (+/−5 degrees).

8. The co-crystallized sucrose/natural sweetener product of claim 6, having an angle of repose (AOR) of about 40° or less.

9. The co-crystallized sucrose/natural sweetener product of claim 6, characterized by peaks in the carbon-13 NMR spectrum having chemical shift values of about 104.8, about 104.1, about 101.9, about 98.4, about 96.3, about 94.4, and about 92.5 ppm.

10. The co-crystallized sucrose/natural sweetener product of claim 6, wherein the natural sweetener in the co-crystallized sucrose/natural sweetener product is present in an amount of about 0.01 to about 50% by weight of the product.

11. The co-crystallized sucrose/natural sweetener product produced in accordance with the process of claim 3, the co-crystallized sucrose/natural sweetener product consisting essentially of:
    a natural, non-caloric sweetener extract of the family Asteraceae (Compositae) or a natural terpenoid glycoside extract of *Stevia rebaudiana* (Bertnoni) having a sweetness as measured by a human tasting panel of 50 times or greater the sweetness of sucrose;
    invert syrup; and
    sucrose,
    wherein the sweetener product has a taste flavor profile the same as natural sucrose.

12. The co-crystallized sucrose/natural sweetener product prepared in accordance with the process of claim 3.

13. The co-crystallized sucrose/natural sweetener product of claim 12, having a granular physical form, the granules having an angle of repose (AOR) between about 20° and about 50°.

14. A comestible including the co-crystallized sucrose/natural sweetener product prepared in accordance with claim 3.

15. The comestible of claim 14, selected from the group consisting of bakery goods, ice cream, sauces, desserts, and breads.

16. The co-crystallized sucrose/natural sweetener product of claim 12, wherein the co-crystallized sucrose/natural sweetener product is an adhesionless powder mixture, exhibiting no visual inter-particulate forces.

17. The co-crystallized sucrose/natural sweetener product of claim 12, having a differential scanning calorimetry (DSC) thermogram which shows one peak only, at approximately 179° C., and wherein the co-crystallized sucrose/ natural sweetener product exhibits a taste test profile according to ASTM MNL 14 that corresponds to a taste test profile of pure sugar.

18. The co-crystallized sucrose/natural sweetener product of claim 12, wherein the co-crystallized sucrose/natural sweetener product is characterized by a flavor profile compared to sugar, a mouth sensation profile compared to sugar, and an aftertaste flavor profile compared to sugar.

19. The process of claim 3, wherein the sucrose in water solution has a sugar-to-water mass ratio ranging from 60° Brix to 67.5° Brix.

20. The process of claim 3, which includes contacting the sucrose solution with the invert syrup to generate a sucrose/invert solution and then adding the natural sweetener to produce the admixture of sucrose, invert syrup and natural sweetener.

* * * * *